United States Patent
Kagawa et al.

(10) Patent No.: US 8,339,556 B2
(45) Date of Patent: Dec. 25, 2012

(54) ELECTRO-OPTICAL DEVICE AND DISPLAY DEVICE WITH INTERDIGITAL ELECTRODE PORTIONS ON AT LEAST FIRST AND SECOND SUBSTRATES WHICH ARE NON-OVERLAPPING IN A DIRECTION NORMAL TO THE SUBSTRATES

(75) Inventors: Hiroyuki Kagawa, Hitachinaka (JP); Shintaro Takeda, Hitachi (JP)

(73) Assignees: Hitachi Displays, Ltd., Chiba (JP); Panasonic Liquid Crystal Display Co., Ltd., Hyogo-ken (JP)

( * ) Notice: Subject to any disclaimer, the term of this patent is extended or adjusted under 35 U.S.C. 154(b) by 328 days.

(21) Appl. No.: 12/372,919

(22) Filed: Feb. 18, 2009

(65) Prior Publication Data

US 2009/0219466 A1    Sep. 3, 2009

(30) Foreign Application Priority Data

Mar. 3, 2008 (JP) ................. 2008-051912
Mar. 3, 2008 (JP) ................. 2008-052146

(51) Int. Cl.
*G02F 1/1343* (2006.01)
*G02F 1/07* (2006.01)
(52) U.S. Cl. ............. 349/141; 349/168; 359/256
(58) Field of Classification Search ............. 349/168, 349/141; 359/256
See application file for complete search history.

(56) References Cited

U.S. PATENT DOCUMENTS

| | | | |
|---|---|---|---|
| 6,222,599 B1 * | 4/2001 | Yoshida et al. | 349/106 |
| 6,266,109 B1 | 7/2001 | Yamaguchi et al. | |
| 2002/0176043 A1 * | 11/2002 | Fukami et al. | 349/141 |
| 2004/0263749 A1 * | 12/2004 | Jeong et al. | 349/141 |
| 2007/0070282 A1 * | 3/2007 | Shibahara et al. | 349/141 |
| 2008/0007666 A1 | 1/2008 | Takeda et al. | |
| 2008/0192182 A1 | 8/2008 | Kajita et al. | |

FOREIGN PATENT DOCUMENTS

JP        05-336477        12/1993

(Continued)

OTHER PUBLICATIONS

Hisakado et al., "Larg Electo-optic Kerr Effect in Polymer-Stabilized Liquid-Crystalline Blue Phases", Advance Materials, vol. 17, No. 1, pp. 96-98, Jan. 2005.

(Continued)

*Primary Examiner* — Lauren Nguyen
(74) *Attorney, Agent, or Firm* — Antonelli, Terry, Stout & Kraus, LLP.

(57) ABSTRACT

Provided is an electro-optical device which allows high-speed response and has high luminance and contrast. The electro-optical device includes: a plurality of substrates opposed to each other; a medium layer sandwiched between the substrates; electrode groups formed on opposed surfaces of the substrates, for applying an electric field to the medium layer, the electrode groups having a portion in which the electrode groups have an interdigit shape and are arranged substantially parallel; and a pair of polarizing plates which are arranged so that absorption axes thereof are substantially orthogonal to each other with the medium layer sandwiched therebetween, in which the medium layer includes a medium substantially having optical-isotropy with absence of an electric field and exhibiting optical-anisotropy with an applied electric field, the electrode groups include transparent electrodes, and the optical-anisotropy is imparted near the respective electrodes in a direction normal to the substrates by the electrode groups.

22 Claims, 16 Drawing Sheets

FOREIGN PATENT DOCUMENTS

| | | |
|---|---|---|
| JP | 3504159 | 12/2003 |
| JP | 2004-038209 | 2/2004 |
| JP | 2005-537520 | 12/2005 |
| JP | 2006-003840 | 1/2006 |
| JP | 2007-086205 | 4/2007 |
| JP | 2007-171938 | 7/2007 |
| WO | WO 2004/029697 | 4/2004 |

OTHER PUBLICATIONS

Shimbo et al., "Ideal Liquid Crystal display mode Using Achiral Banana-Shaped Liquid Crystals", Japanese Journal of Applied Physics, vol. 45, No. 10, pp. L282-L284, Mar. 2006.

* cited by examiner

ELECTRO-OPTICAL DEVICE AND DISPLAY DEVICE WITH INTERDIGITAL ELECTRODE PORTIONS ON AT LEAST FIRST AND SECOND SUBSTRATES WHICH ARE NON-OVERLAPPING IN A DIRECTION NORMAL TO THE SUBSTRATES

CROSS-REFERENCE TO RELATED APPLICATIONS

The present application claims priority from Japanese applications JP 2008-051912 and JP 2008-052146 filed on Mar. 3, 2008, the content of which is hereby incorporated by reference into this application.

BACKGROUND OF THE INVENTION

1. Field of the Invention

The present invention relates to an electro-optical device and a display device. In particular, the present invention relates to an electro-optical device and a display device such as a liquid crystal display device having high-speed responsibility with respect to an applied voltage and high light transmittance, for controlling light transmission and interception.

2. Description of the Related Art

A liquid crystal display device is widely used for a display unit of various electronic devices such as a liquid crystal display television, a monitor for a personal computer, a mobile phone, and a digital camera, and has a feature of being thin and light, and of low power consumption.

There are many display types in the liquid crystal display device, and there is known an in-plane-switching (IPS) type (JP 3504159 B) as a representative liquid crystal display type of a liquid crystal display device, which is viewable at wide angles. In the IPS type liquid crystal display device, liquid crystals in a nematic phase are generally used. Those liquid crystal molecules are held in a space sandwiched between two substrates. An electric field is applied to the liquid crystal molecules, their orientation directions are rotated, and their effective light axes are rotated in a plane parallel to the substrates, to thereby control light transmittance of the liquid crystal. Accordingly, display is performed.

In the IPS type liquid crystal display device, various types have been proposed as types in which an electric field is applied to liquid crystal molecules. The most general one is to form a source electrode and a common electrode having an interdigit shape on a single substrate. This type includes a type of forming both the source electrode and the common electrode into an interdigit shape on one substrate and a type of forming one of the source electrode and the common electrode into an interdigit shape and forming the other thereof into a plate shape to arrange them on one substrate via an insulating layer.

On the other hand, with respect to the IPS type liquid crystal display device, there have been proposed recently liquid crystal display devices in which a material changing from optical-isotropy phase to optical-anisotropy phase in response to an applied voltage is used (JP 3504159 B). In such liquid crystal display devices described above, a liquid crystal material having a blue phase, a liquid crystal material having cubic symmetry, and the like are used (Yoshiaki Hisakado etc., "Large Electro-optic Kerr Effect in Polymer-Stabilized Liquid-Crystalline Blue Phases," Advanced Materials, Vol. 17, No. 1, 96 (2005)), and an electric field parallel to the substrates is applied by the interdigit electrodes as in the IPS type. In those liquid crystal display devices, much higher response characteristics of several microseconds to several ten microseconds are obtained compared with the IPS type in which a conventional nematic liquid crystal is used, and thus a display quality for movie display is expected to be greatly improved. However, in an electrode structure in which an electrode interval between the interdigit electrodes is made smaller than an interval between upper and lower substrates (JP 2007-86205 A), and an electric field above the electrode has a small component parallel to a substrate surface. Therefore, if an optically anisotropic material is applied for a medium layer with the structure, the medium layer above the electrode cannot exhibit the optical-anisotropic property.

However, for example, in a liquid crystal display device which is driven by the interdigit electrodes using a blue phase liquid crystal as a liquid crystal material, even when a transparent electrode is used for the electrodes, light does not pass through a region of the electrode portions. This is partially because a normal electric field intensity to be applied to the liquid crystal molecules which are positioned above the electrodes is weak, and therefore optical-anisotropy is not imparted to the liquid crystal molecules. Further, this is also partially because the electric field above the electrode a small component parallel to a substrate surface and a large component vertical to the substrate surface.

In the liquid crystal display device using the blue phase liquid crystal, polarizing plates are attached to outer sides of two substrates so that polarization axes of the respective polarizing plates are at an angle of about 45 degrees with respect to a longitudinal direction of the interdigit electrodes which are aligned parallel to each other. Optical-anisotropy of the liquid crystal molecules is imparted in a direction of an electric field. In a region between the electrodes, the electric field is applied substantially parallel to the substrate surface. When the liquid crystal molecules positioned in the region are applied in the electric field, optical-anisotropy is imparted in the direction of the electric field, which is a direction of 45 degrees with respect to the respective polarizing plates. Hence, light which has entered from the outside is transmitted through the region. However, the electric field applied to a region immediately above the electrode has a weak electric field intensity, and has a larger component vertical to the substrate than one parallel to the substrate. Therefore, the optical-anisotropy imparted to the liquid crystal molecules positioned in the region is small and the optical-anisotropy is in the direction vertical to the substrate, and hence an optical axis of the light which has entered from the outside cannot be rotated, whereby light cannot be transmitted.

FIG. 18 is a vertical cross-sectional view of an electro-optical device according to a related art. FIG. 19 is a plan view of the electro-optical device according to the related art when viewed from an arrow A of FIG. 18. A medium layer 203 is sealed between a substrate 101 and a substrate 103, and an electrode 105 and an electrode 106 are formed on the substrate 101. Polarizing plates 104 and 207 are respectively attached to outer sides of the substrate 101 and the substrate 103. Polarization axes of the respective polarizing plates are at an angle of about 45 degrees with respect to a longitudinal direction of the electrodes. A relative relationship between an applied voltage and transmittance in a case where an alternating voltage is applied from an external power source (not shown) to the electrodes 105 and 106 is illustrated by (b) of FIG. 20. The electro-optical device according to the related art has an extremely low light transmittance, and therefore cannot be adapted to an actual device. As a result of observation with a microscope, in the electro-optical device according to the related art, light is not transmitted at all through a region above the electrode having an interdigit shape.

Unlike the nematic liquid crystal, the blue phase liquid crystal has an extremely short interaction length between liquid crystal molecules. Accordingly, in the liquid crystal display device using the blue phase liquid crystal, even when optical-anisotropy is generated in liquid crystal molecules positioned in a region between the electrodes, the influence of the optical-anisotropy does not extend to the liquid crystal molecules in a region above the electrode.

For those reasons, the optical-anisotropy is not imparted to the liquid crystal molecules positioned in the region above the electrode, and hence light is not transmitted through the region above the electrode, whereby the entire transmittance is reduced. Therefore, it is necessary to increase luminance of a backlight so as to obtain appropriate luminance for a liquid crystal display device, which leads to a problem in that power consumption is increased. When a liquid crystal display device using an optically-anisotropic liquid crystal material which reacts to an applied electric field at high speed, such as the blue phase liquid crystal, is put into practical use, it is indispensable to increase the light transmittance of the liquid crystal so as to obtain a clear image.

Further, in the liquid crystal display device using the blue phase liquid crystal and the interdigit electrodes, there arises a problem that an electric field from a voltage at which the maximum transmittance is attained is several V/μm, which is extremely high, and the voltage is about ten times as high as or higher than a drive voltage for the IPS type liquid crystal display device using the nematic liquid crystal. As a result, a drive switching device which is driven at low voltage, such as a thin film transistor, cannot be used for a drive switching device therefor.

Further, as a result of evaluating characteristics of the display device based on known information, the applied electric field has a small component parallel to the substrate surface in a region above the source electrode or the common electrode, and hence light is not transmitted through the region. Even when the electrode is transparent, the fact scarcely contributes to a screen display.

SUMMARY OF THE INVENTION

The present invention is aimed to solve the above-mentioned problems, and therefore an object thereof is to provide a device having high transmittance and capable of being driven even at a low voltage in an electro-optical device using a material that changes optical-anisotropy by an applied electric field, such as a blue phase liquid crystal.

Further, in a display device using an isotropic liquid crystal and an interdigit electrode, transmittance above the electrode may be improved.

In order to achieve the above-mentioned object, according to the present invention, an electro-optical device includes: a plurality of substrates which are opposed to and parallel to each other; a medium layer sandwiched between the plurality of substrates; a pair of polarizing plates which are arranged so that absorption axes thereof are substantially orthogonal to each other with the medium layer sandwiched between the pair of polarizing plates; and a plurality of electrode groups including a plurality of transparent electrodes having an interdigit shape, which are formed on at least two surfaces of the plurality of substrates and arranged substantially parallel to each other, and controls light transmission and interception by an electric field applied from the plurality of electrode groups. The medium layer includes a medium substantially having optical-isotropy with absence of an electric field and exhibiting optical-anisotropy along with an applied electric field. The optical-anisotropy is imparted to the medium layer by an applied electric field to a region of the medium layer including regions above the plurality of transparent electrodes in a direction normal to the plurality of substrates by at least two of the plurality of electrode groups.

Further, the plurality of electrode groups impart an electric field at least in a direction parallel to the plurality of substrates to the medium layer. A region of the medium layer to which the electric field is applied by one of the plurality of electrode groups includes a region above another one of the plurality of electrode groups in the direction normal to the plurality of substrates.

Further, the absorption axes of the pair of polarizing plates are parallel to the plurality of substrates and are arranged respectively at an angle of 45 degrees±10 degrees with respect to a direction in which the applied electric field to the medium layer has a component parallel to the plurality of substrates. A direction of the optical-anisotropy which is imparted to the regions above the plurality of transparent electrodes in the direction normal to the plurality of substrates is one of substantially parallel to and substantially orthogonal to the direction of the applied electric field to the medium layer.

Further, interdigit portions of the plurality of electrode groups are arranged so as to avoid overlap of the interdigit portions in the direction normal to the plurality of substrates.

Further, electric field components of electric fields applied to the medium layer by the plurality of electrode groups in the direction normal to the plurality of substrates are substantially parallel to each other, and the electric fields are applied to the medium layer substantially at the same time.

The electro-optical device further includes: a first substrate and a second substrate which are opposed to each other; a first medium layer sandwiched between the first substrate and the second substrate; a third substrate opposed to the second substrate; a second medium layer sandwiched between the second substrate and the third substrate; a first electrode group provided to the first substrate on a surface side opposed to the second substrate, for applying the electric field to the first medium layer; and a second electrode group provided to the second substrate on a surface side opposed to the third substrate, for applying the electric field to the second medium layer.

The electro-optical device further includes: a first substrate and a second substrate which are opposed to each other; a first medium layer sandwiched between the first substrate and the second substrate; a third substrate opposed to the second substrate; a second medium layer sandwiched between the second substrate and the third substrate; a first electrode group provided to the first substrate on a surface side opposed to the second substrate, for applying the electric field to the first medium layer; and a second electrode group provided to the third substrate on a surface side opposed to the second substrate, for applying the electric field to the second medium layer.

The electro-optical device further includes: a first substrate and a second substrate which are opposed to each other; a first medium layer sandwiched between the first substrate and the second substrate; a third substrate opposed to the second substrate; a second medium layer sandwiched between the second substrate and the third substrate; a first electrode group provided to the second substrate on a surface side opposed to the first substrate, for applying the electric field to the first medium layer; and a second electrode group provided to the second substrate on a surface side opposed to the third substrate, for applying the electric field to the second medium layer.

The electro-optical device further includes: a first substrate and a second substrate which are opposed to each other; a medium layer sandwiched between the first substrate and the second substrate; a first electrode group provided to the first substrate on a surface side opposed to the second substrate, for applying the electric field to the medium layer; and a second electrode group provided to the second substrate on a surface side opposed to the first substrate, for applying the electric field to the medium layer.

Further, one of the first electrode group and the second electrode group which is provided to at least one of the first substrate and the second substrate includes a common electrode and a source electrode which are arranged symmetrically.

In addition, the electro-optical device further includes: a first substrate and a second substrate which are opposed to each other; a medium layer sandwiched between the first substrate and the second substrate; an electrode group including a common electrode, which is provided to the first substrate on a surface side opposed to the second substrate; and an electrode group including a source electrode, which is provided to the second substrate on a surface side opposed to the first substrate. Both the electrode groups impart an inclined electric field to the medium layer.

Further, a display device includes: a pair of substrates; a medium sandwiched between the pair of substrates, which has optical-isotropy with absence of an electric field exhibits optical-anisotropy with an applied electric field; a source electrode and a common electrode, one of which is formed into an interdigit shape, provided to at least one of the pair of substrates on a surface opposed to another one of the pair of substrates; and a planar electrode. The planar electrode is formed on an opposed surface of the another one of the pair of substrates, to which a voltage having the same potential as a potential of one of the source electrode and the common electrode is applied, and a relationship between a liquid crystal layer thickness d and an electrode interval l of the one of the source electrode and the common electrode, which is formed into the interdigit shape, is $d \geq l$.

According to the present invention, the electro-optical device, in which an electric field is applied to the medium having the optical-anisotropy by the plurality of electrode groups including the transparent electrode groups and the light transmission and interception is controlled, is provided with means for imparting the optical-anisotropy to a medium region above the electrode, whereby there can be obtained an electro-optical device with a high display quality, which allows high-speed response and has high luminance and contrast.

DETAILED DESCRIPTION OF THE INVENTION

Hereinafter, with reference to the drawings, embodiments of the present invention are described.

First Embodiment

Example 1

Structure of Electro-Optical Device

Figure 1:
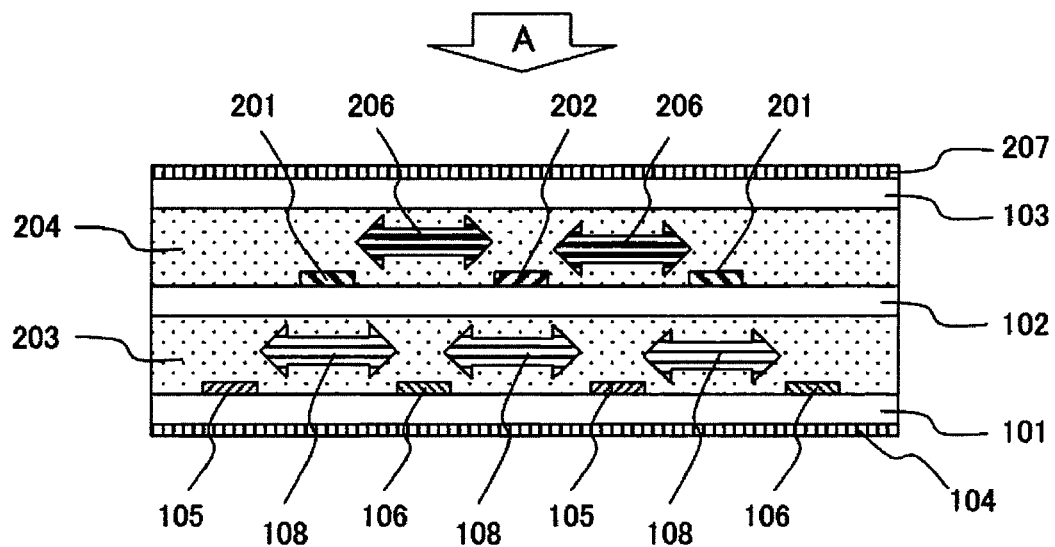
FIG. 1 is a vertical cross-sectional view of an electro-optical device according to Example 1 of the present invention.

FIG. 1 is a vertical cross-sectional view schematically illustrating a main part of an electro-optical device according to Example 1 of the present invention. A liquid crystal display device according to the present invention includes a plurality of substrates 101, 102, and 103, which are arranged at predetermined intervals, and medium layers 203 and 204 arranged in those intervals of the substrates. The substrate 101 is provided with a group of electrodes including electrodes 105 and 106, and owing to an electric field applied by those electrodes, optical-anisotropy 108 is formed in a medium of the medium layer 203. Similarly, the substrate 102 is provided with a group of electrodes including electrodes 201 and 202, and owing to an electric field applied by those electrodes, optical-anisotropy 206 is formed in a medium of the medium layer 204.

Figure 2:
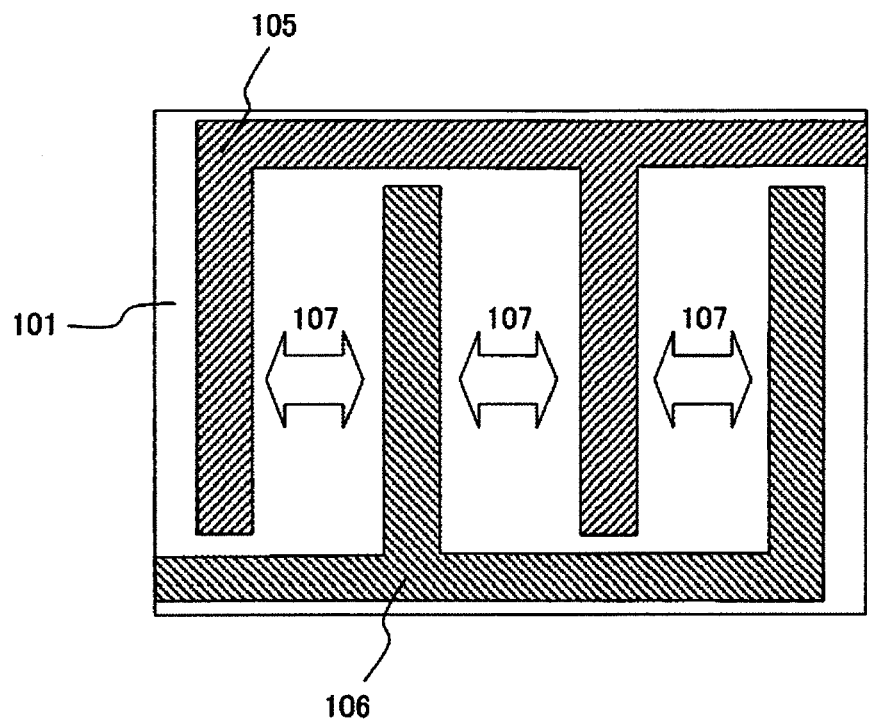
FIG. 2 is a plan view of a substrate having an electrode according to Examples 1 to 4 of the present invention.
Figure 3:
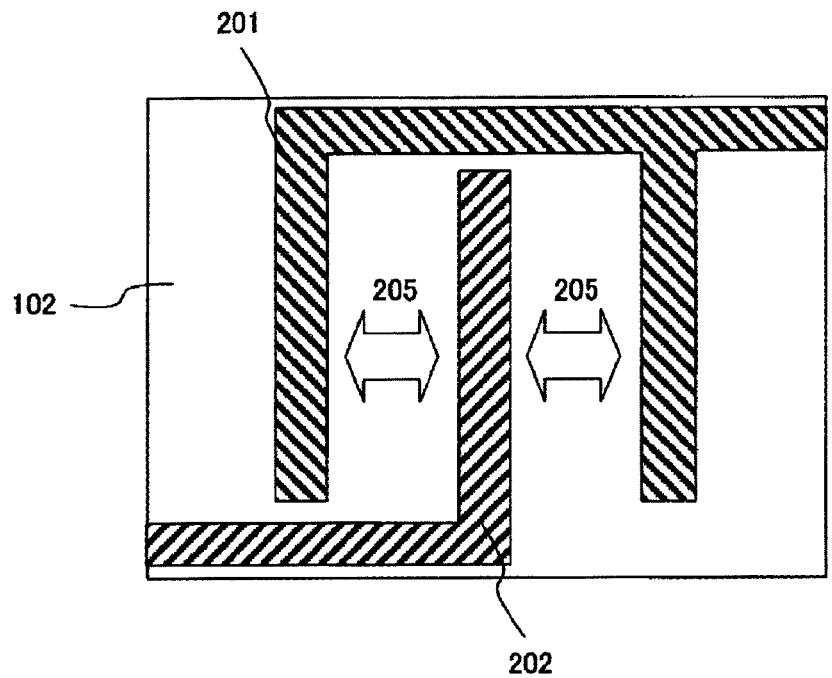
FIG. 3 is a plan view of an opposite substrate having an electrode according to Examples 1 to 4 of the present invention.

FIGS. 2 and 3 are schematic views in which the substrates 101 and 102 are viewed in a direction normal to the substrates. As illustrated in FIG. 2, a plurality of the interdigit electrodes 105 and 106 are arranged on the substrate 101 so that interdigit-longitudinal directions of the electrodes are substantially parallel to each other. Further, as illustrated in FIG. 3, on the substrate 102 as well, the interdigit electrodes 201 and 202 are arranged so that interdigit portions of the electrodes are substantially parallel to each other. In the present invention, for the electrodes 105, 106, 201, and 202, materials having excellent transparency and electric conductivity, such as an indium tin oxide (ITO), a zinc oxide (ZnO), and an indium zinc oxide (InZnO) are used.

Figure 4:
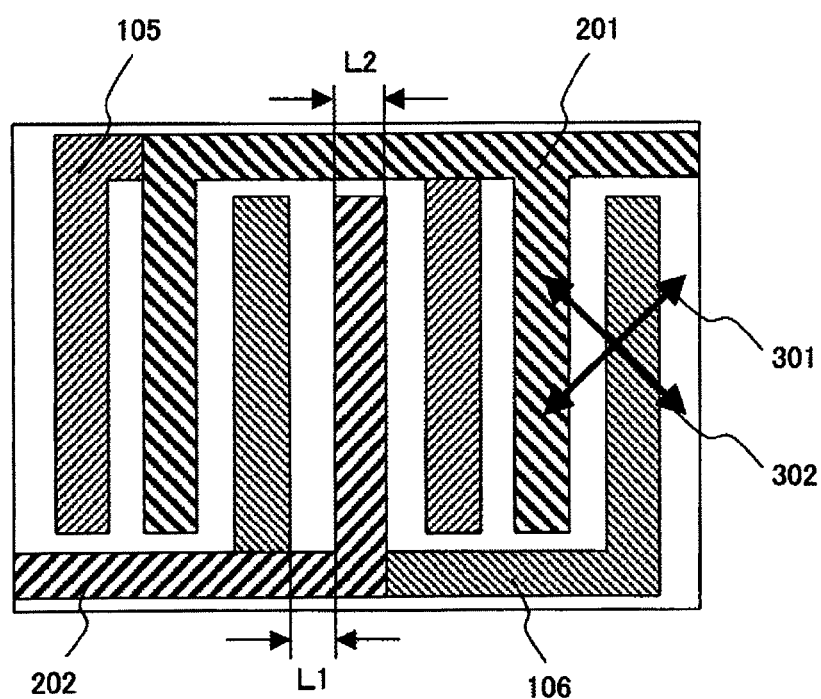
FIG. 4 is a plan view illustrating an electrode arrangement according to Examples 1 to 4 of the present invention.
Figure 5:
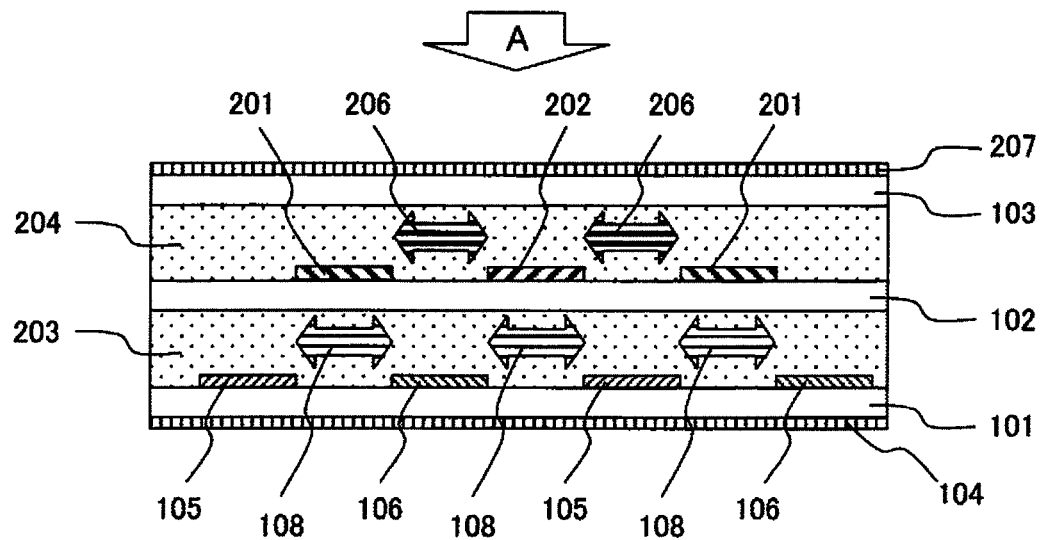
FIG. 5 is a vertical cross-sectional view according to a modification of Example 1 of the present invention.
Figure 6:
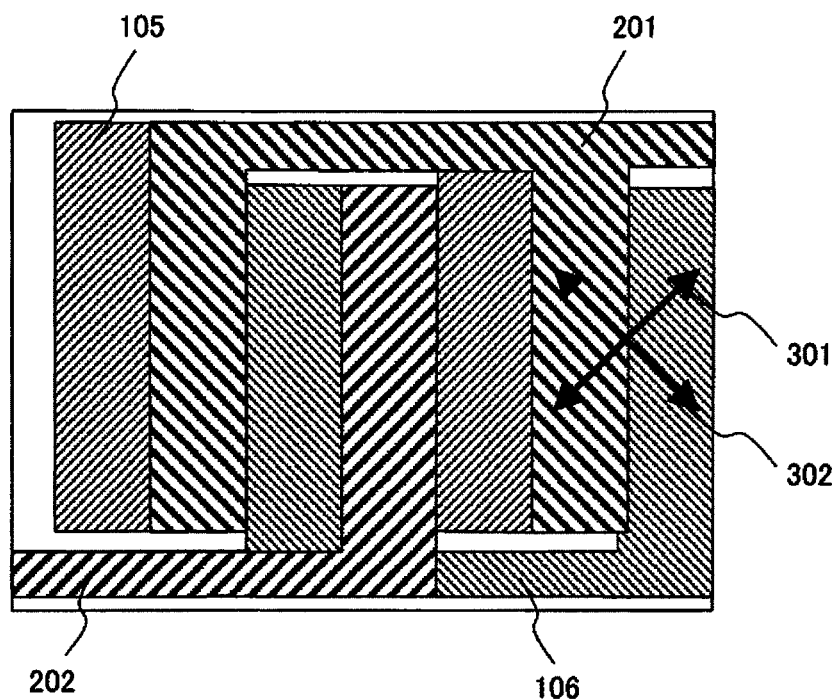
FIG. 6 is a plan view of a substrate having an electrode according to the modification of Example 1 of the present invention.

FIG. 4 is a plan view illustrating a relative relationship between the substrates 101 and 102 when the electro-optical device of FIG. 1 is viewed in a direction of an arrow A, namely, in the direction of the normal to the substrate 101. The substrates 101 and 102 are combined with each other so that the interdigit portions of the interdigit electrodes 105 and 106 and the interdigit portions of the interdigit electrodes 201 and 202 formed on the respective substrates do not overlap with each other in the direction normal to the substrate. Further, a gap L1 between the electrodes 105 and 106 on the first substrate 101 and the electrodes 201 and 202 on the second substrate 102 when viewed from the arrow A of FIG. 1, or an electrode width L2 of each interdigit portion of the electrodes may be preferably as small as possible. In a case where the gap L1 between the electrodes is as small as possible, the electrodes are arranged as in a modification of Example 1 of the present invention illustrated in FIGS. 5 and 6.

In the gap L1, as illustrated in FIG. 1, the optical-anisotropy 108 which is imparted to the medium of the medium layer 203 and the optical-anisotropy 206 which is imparted to the medium of the medium layer 204 overlap with each other, and therefore a degree of optical-anisotropy becomes larger compared with the optical-anisotropy above the electrodes, which leads to non-uniform transparency of the medium layers and deterioration of an image quality. On the other hand, when the interdigit portions of the electrodes overlap with each other, optical-anisotropy is not imparted to a medium positioned in the overlapped region of the medium layers 203 and 204, and hence light is not transmitted through this region. Therefore, it is preferable to minimize the gap L1 or the electrode width L2 as much as possible. When the electrode width L2 is processed as small as possible and an area between the electrodes is increased, a difference between the optical-anisotropy above the electrodes and inter-electrode optical-anisotropy affects the image quality to a less extent, and optical-anisotropy imparted by the two medium layers is superimposed between the electrodes. Accordingly, low voltage driving is enabled in appearance.

In the present invention, the medium layer 203 positioned between the substrates 101 and 102 and the medium layer 204 positioned between the substrates 102 and 103 are formed of a medium which substantially has optical-isotropy with absence of an electric field and has optical-anisotropy with an applied electric field. Examples of the medium include a blue phase liquid crystal material and a medium having cubic symmetry.

The blue phase liquid crystal material is a material obtained by polymerizing a monomer in which a nematic liquid crystal composition containing a chiral dopant is included on a blue phase thereof enlarging a temperature region of the blue phase in a liquid crystal composition. For the nematic liquid crystal, an organic compound having a long chain structure and a ring structure in which a polar group generally used in a liquid crystal display is substituted is used. Further, for the chiral dopant, an organic compound having an asymmetric carbon in a molecule is used. As a representative active monomer, an acrylic monomer is used. In a case of photo polymerization, a photo-polymerization initiator such as an acetophenone derivative is combined.

When different potentials are applied from an external power source (not shown) to the electrodes 105 and 106 of the electro-optical device as configured above, an electric field is applied to the medium layer 203 in a direction of an arrow 107 of FIG. 2. With this, the optical-anisotropy 108 is imparted to the medium of the medium layer 203 between the electrodes 105 and 106 in substantially the same direction as in the electric field direction 107. Further, when different potentials are applied between the electrodes 201 and 202, an electric field is applied to the medium layer 204 in a direction of an arrow 205 of FIG. 3, and the optical-anisotropy 206 is imparted to the medium of the medium layer 204 between the electrodes 201 and 202 in substantially the same direction as in the electric field direction 205. Specifically, in the structure of FIGS. 1 to 3, the electric field direction 107 and the electric field direction 205 are substantially parallel to each other, and the optical-anisotropy 108 and the optical-anisotropy 206 which are generated in the medium layers 203 and 204 along with the electric applied field are also substantially parallel to each other.

Here, the optical-anisotropy means a refractive-index anisotropy, which is a difference of refractive indexes imparted by an electric field in an in-plane direction of a substrate, namely, anisotropy. The arrows of the optical-anisotropy 108 and 206 of FIG. 1 indicate a direction in which larger refractive indexes are imparted compared with an orthogonal direction thereof.

It is desirable to impart the optical-anisotropy 108, which is to be imparted to the medium of the medium layer 203, and the optical-anisotropy 206, which is to be imparted to the medium of the medium layer 204, at substantially the same time. Thus, more desirably, a timing at which a potential difference is given between the electrodes 105 and 106 may be the same as a timing at which a potential difference is given between the electrodes 201 and 202. Accordingly, for example, the electrode 105 and the electrode 201, and the electrode 106 and the electrode 202, may be connected to each other.

In the structure of Example 1, the optical-anisotropy 206 is imparted to a medium, of the medium layer 204, positioned immediately above the interdigit portions of the electrodes 105 and 106 on the substrate 101 in the direction normal to the substrate. Hence, when observed from the direction of the arrow A of FIG. 1, the optical-anisotropy is imparted to the interdigit portions of the electrodes 105 and 106 on the substrate 101.

A first polarizing plate 104 and a second polarizing plate 207 are respectively arranged outside the substrates 101 and 103 of the electro-optical device of the present invention. The first polarizing plate 104 and the second polarizing plate 207 contain iodine dye, and the iodine forms multimeric complex within the polarizing plates 104 and 207 to be oriented. Owing to dichroism thereof, the polarizing plates 104 and 207 convert natural light which has entered into linearly polarized light having a sufficiently high degree of polarization. An orientation direction of the multimeric complex of the iodine dye is an absorption axis, and absorption axes 301 and 302 of the first polarizing plate 104 and of the second polarizing plate 207 are respectively arranged at an angle of 45 degrees±10 degrees with respect to the electric field directions 107 and 205 of the electric fields applied to the medium layers 203 and 204.

Specifically, as illustrated in FIG. 4, the absorption axes 301 and 302 of the polarizing plates 104 and 207 are arranged clockwise and counterclockwise, respectively, at an angle of 45 degrees±10 degrees with respect to the longitudinal direction of the interdigit portions of the electrodes 105, 106, 201, and 202. The angle of ±10 degrees is set as a range of absorbing production errors and the like of the electrodes. The polarizing plates 104 and 207 may be arranged inside the substrates, namely, on the medium layer side, and may be formed of a polymer liquid crystal material containing a water-soluble lyotropic liquid crystal dye material or a dichroic dye. Further, as an integrated polarizing layer, a wire-grid polarizer in which thin conductive wires are arranged at intervals shorter than a light wavelength can be adopted.

When the polarizing plates 104 and 207 are arranged as described above, light which has entered from a substrate 101 direction is converted into linearly polarized light by the first polarizing plate 104. When a voltage is not applied, the medium of each of the medium layers 203 and 204 optically exhibits isotropy, and hence after the light is transmitted through the substrate 103, the light is interrupted by the second polarizing plate 207. Specifically, when a voltage is not applied, light is not transmitted, whereby black is displayed. When a voltage is applied, polarized light that has entered from the substrate 101 direction and passed through the portion between the electrodes 105 and 106 becomes elliptically polarized light having a light axis rotated at a right angle by the optical-anisotropy 108 imparted to the medium of the medium layer 203. The optical-anisotropy is not imparted to the media of regions, of the medium layer 204, positioned above the transparent electrodes 201 and 202, and hence the light axis of the polarized light passing through the regions is not rotated. Accordingly, the light can pass through the second polarizing plate 207 to be emitted outside.

Further, as to the polarized light that has entered from the substrate 101 direction and passed through the interdigit portions of the transparent electrodes 105 and 106, the optical-anisotropy is not imparted to the media of regions, of the medium layer 203, positioned above the electrodes 105 and 106, and hence the light axis thereof cannot be rotated in the medium layer 203. Then, the light axis is rotated at a right angle by the optical-anisotropy 206 imparted to the medium of regions, of the medium layer 204, positioned between the transparent electrodes 201 and 202, and the light passes through the substrate 103. With this, this light can also pass through the second polarizing plate 207 to be emitted outside. Specifically, when a voltage is applied, light is transmitted, whereby white is displayed. The light that has passed through the interdigit portions of the transparent electrodes 105, 106, 201, and 202 is all transmitted. Accordingly, the light is also transmitted through the electrode portions compared with a case where the media to which the optical-anisotropy is separately imparted are not positioned on the transparent electrodes 105 and 106, that is, a case where the medium layer 204 or the substrate 102 is absent, whereby higher transmittance can be obtained.

[Manufacturing Method for Example 1]

The electro-optical device of Example 1 was manufactured according to the following general processes. First, ITO was deposited on glass substrates by sputtering, photo resist was applied thereon, and the resultant were subjected to exposure and etching processes, to thereby form a first substrate 101 having interdigit electrodes illustrated in FIG. 2 and a second substrate 102 having interdigit electrodes illustrated in FIG. 3. A thickness of the ITO was 100 nm, an electrode width of an interdigit portion was 10 µm, and an electrode interval was 15 µm. The first substrate 101 and the second substrate 102 on which the interdigit electrodes were formed were bonded to each other so that an electrode formation surface of the first substrate 101 was opposed to a back surface of an electrode formation surface of the second substrate 102 and so that a substrate interval was 15 µm by a spacer (not shown) and a sealing adhesive around the substrates. Further, a glass substrate 103 was bonded to the second substrate 102 in the same manner so that an interval therebetween was 15 µm. Next, as medium layers 203 and 204, a blue phase liquid crystal mixture was injected between the first substrate 101 and the second substrate 102 and between the second substrate 102 and the third substrate 103.

As the liquid crystal mixture, a mixture of an acrylic monomer, a liquid crystal material, a chiral dopant, and a photopolymerization initiator, which is described in JP 2007-86205 A, was used. After the injection of the liquid crystal mixture, the resultant was irradiated with ultraviolet light by a high-pressure mercury-vapor lamp in a temperature range of a blue phase, and the acrylic monomer was polymerized, to thereby stabilize the blue phase.

Next, an electrode 105 of the first substrate 101 and an electrode 201 of the second substrate 102 were connected to each other at substrate end portions, and an electrode 106 of the first substrate 101 and an electrode 202 of the second substrate 102 were connected to each other at substrate end portions. Further, a first polarizing plate 104 and a second polarizing plate 207 were bonded to outer sides of the first substrate 101 and the third substrate 103, respectively, so that respective absorption axes of the first polarizing plate 104 and of the second polarizing plate 207 were arranged at an angle of about 45 degrees of a longitudinal direction of the interdigit electrodes, as illustrated in FIG. 4.

Figure 20:
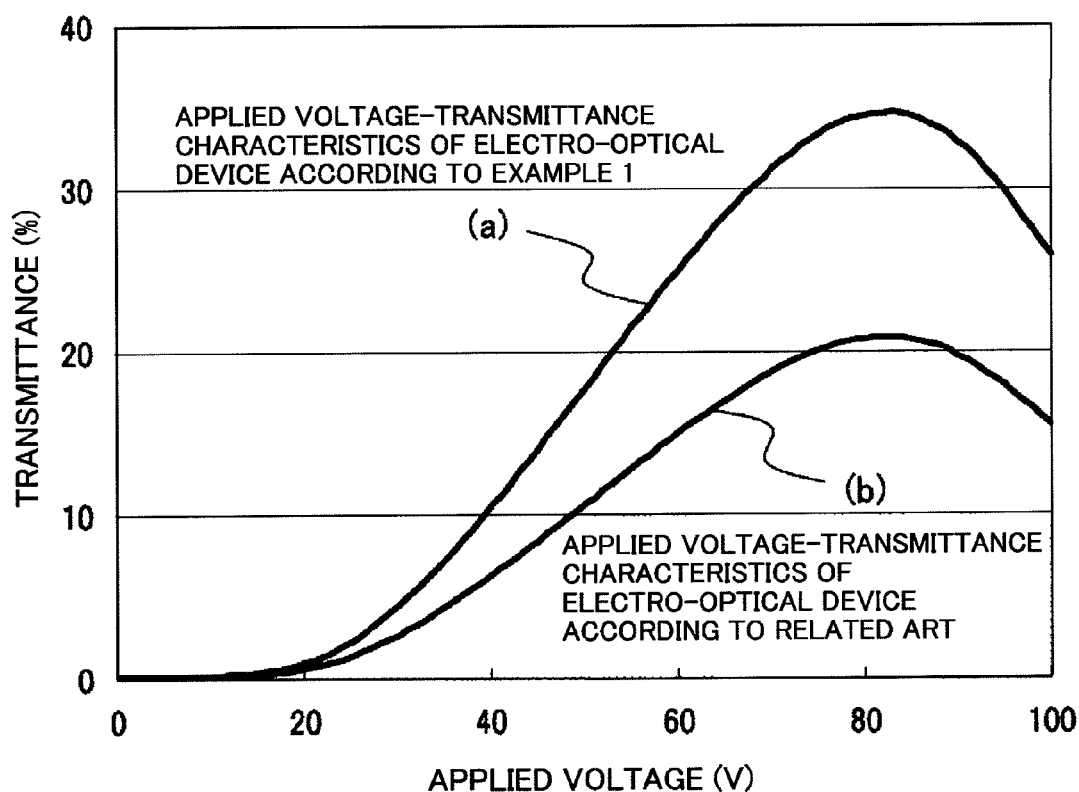
FIG. 20 is an explanatory graph of applied voltage-transmittance characteristics according to Example 1 of the present invention and the related art.

An alternating voltage was applied from an external power source to the connected electrodes 105 and 201 and to the connected electrodes 106 and 202. (a) of FIG. 20 illustrates an relative relationship between an applied voltage and transmittance. In the manufactured electro-optical device, higher transmittance was obtained compared with a conventional device illustrated in Comparative Example 1 described below. As a result of an observation with a microscope, light was transmitted above the interdigit electrodes, and hence the effect of the present invention was verified.

Example 2

Figure 7:
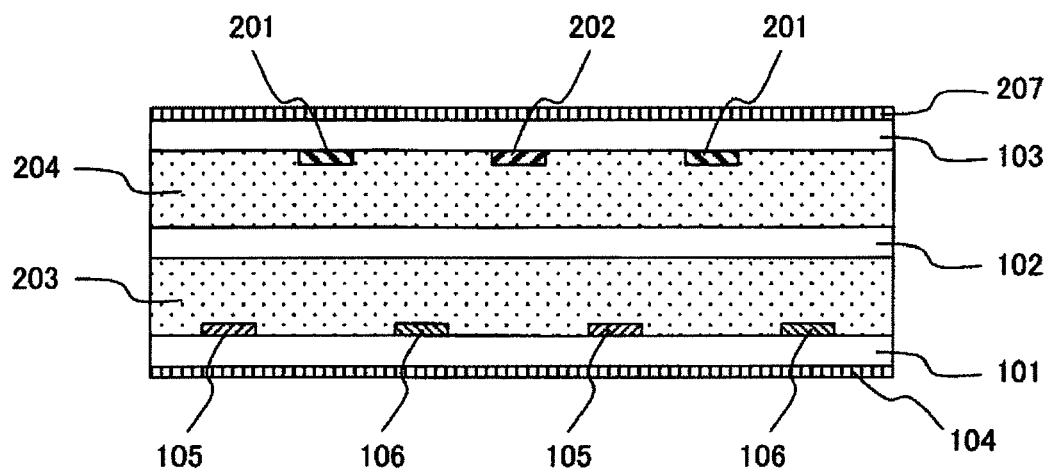
FIG. 7 is a vertical cross-sectional view of an electro-optical device according to Example 2 of the present invention.

FIG. 7 is a vertical cross-sectional view of an electro-optical device according to Example 2 of the present invention. A plane structure of a substrate having an electrode and a plane structure of the electro-optical device are the same as those illustrated in FIGS. 2 and 4. Example 2 is different from Example 1 in that, in the electro-optical device of Example 2, the transparent electrodes 201 and 202 which apply an electric field to the medium layer 204 are formed on the third substrate 103. Similarly to Example 1, when different potentials are applied between the electrodes 201 and 202, an electric field is applied to the medium layer 204, and accordingly optical-anisotropy is also imparted to the medium of the medium layer 204. As a result, similarly to Example 1, when a voltage is applied, light of the incident light, which has passed through the transparent electrodes 105 and 106, is also transmitted outside, to thereby obtain high transmittance.

[Manufacturing Method for Example 2]

The electro-optical device of Example 2 was manufactured according to the following description. As in Example 1, the glass substrate having interdigit electrodes illustrated in FIG. 2 was manufactured. The substrate 101 on which the electrodes 105 and 106 were formed and a glass substrate 102 having no electrodes were bonded to each other, and the glass substrate 103 on which the electrodes 201 and 202 were formed was bonded to the substrate 102 so that an electrode formation surface of the substrate 103 was opposed to the substrate 102. Similarly to Example 1, as the medium layers 203 and 204, the liquid crystal mixture was injected between the respective substrates to polymerize the monomer by light irradiation.

Further, as in Example 1, the electrode 105 on the substrate 101 and the electrode 201 on the substrate 103 were connected at the substrate end portions, and the electrode 106 on the substrate 101 and the electrode 202 on the substrate 103 were connected at the substrate end portions. Then, the first polarizing plate 104 and the second polarizing plate 207 were bonded to the outer sides of the substrate 101 and the substrate 103, respectively, so that the respective absorption axes of the first polarizing plate 104 and of the second polarizing plate 207 were arranged at an angle of about 45 degrees of the longitudinal direction of the interdigit electrodes, respectively, as illustrated in FIG. 4. An alternating voltage was applied from an external power source (not shown) to the connected electrodes 105 and 201 and to the connected electrodes 106 and 202. The relative relationship between the applied voltage and transmittance exhibited substantially the same characteristics illustrated by (a) of FIG. 20 as in Example 1, and higher transmittance was obtained compared with a conventional example illustrated by (b) of FIG. 20.

Example 3

Figure 8:
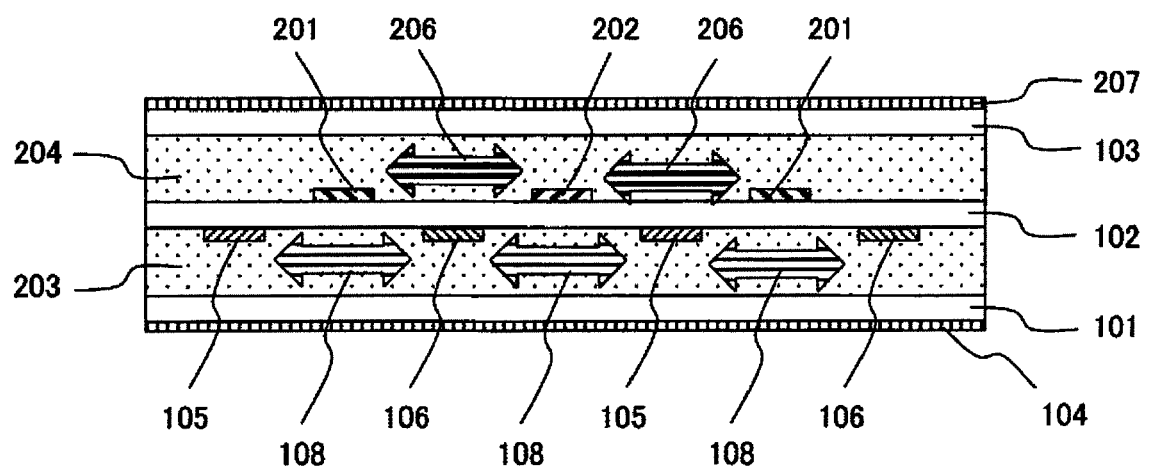
FIG. 8 is a vertical cross-sectional view of an electro-optical device according to Example 3 of the present invention.

FIG. 8 illustrates a cross-sectional structure of an electro-optical device according to Example 3 of the present invention. A plane structure of a substrate having an electrode and a plane structure of the electro-optical device are the same as those illustrated in FIGS. 2 and 4. Example 3 is different from Example 1 in that, in the electro-optical device of Example 3, the transparent electrodes 105 and 106 which apply an electric field to the medium layer 203 are formed on the second substrate 102. Similarly to Example 1, when different potentials are applied between the electrodes 201 and 202, an electric field is applied to the medium layer 204, and accordingly optical-anisotropy is imparted thereto. As a result, similarly to Example 1, when a voltage is applied, light of the incident light, which has passed through the transparent electrodes 105 and 106, is also transmitted outside, to thereby obtain high transmittance.

Example 4

Figure 9:
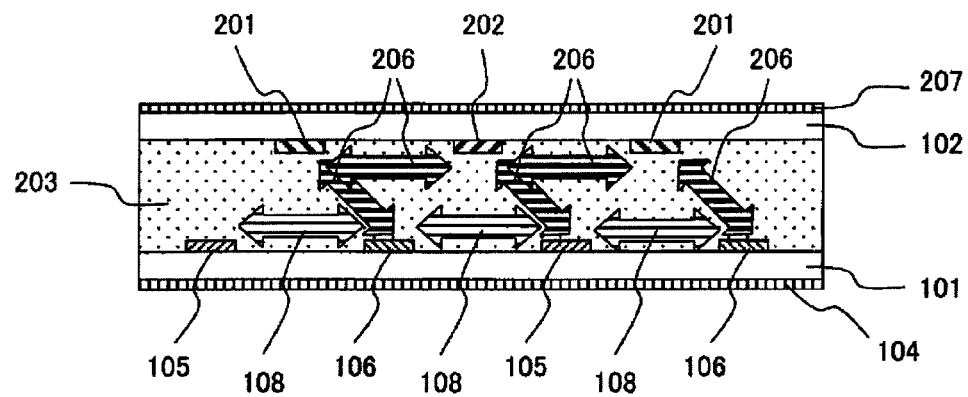
FIG. 9 is a vertical cross-sectional view of an electro-optical device according to Example 4 of the present invention.

FIG. 9 is a vertical cross-sectional view of an electro-optical device having a single medium layer according to Example 4 of the present invention. A plane structure of a substrate 101 having electrodes and a plane structure of the electro-optical device are the same as illustrated in FIGS. 2 and 4.

The electro-optical device of Example 4 has the medium layer 203 as a single layer. The transparent electrodes 201 and 202 are provided on a surface of the second substrate 102, the surface being opposed to the first substrate 101. Similarly to the electro-optical device of Example 1 of FIG. 1, when different potentials are applied between the electrodes 105 and 106, the optical-anisotropy 108 is imparted to a medium of the medium layer 203 positioned in a region between the electrodes 105 and 106. Further, when different potentials are applied between the electrodes 201 and 202, the optical-anisotropy 206 is imparted to a medium of the medium layer 203 positioned in a region between the electrodes 201 and 202. Moreover, when different potentials are applied between the electrodes 105 and 202 and between the electrodes 106 and 201, the optical-anisotropies 206 can also be imparted to media of the medium layer 203 positioned in a region between the electrodes 105 and 202 and a region between the electrodes 106 and 201. Of the medium layer 203, regions of the optical-anisotropies 206 imparted by the electrodes 201 and 202 formed on the second substrate 102 are regions immediately above the electrodes 105 and 106 formed on the first substrate 101 in the direction normal to the substrate, respectively. As a result, as in the electro-optical device of Example 1, when a voltage is applied, light of the incident light, which has passed through the transparent electrodes 105 and 106, is also transmitted outside, thereby to obtain high transmittance.

Figure 10:
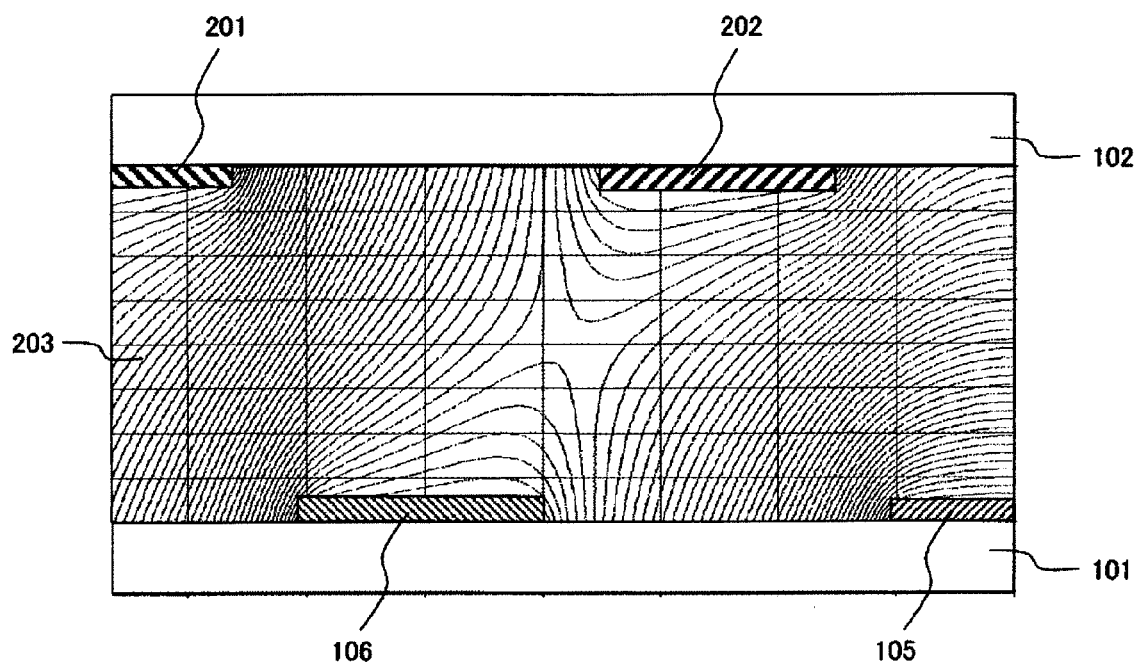
FIG. 10 is a view illustrating an electric field simulation according to Example 4 of the present invention.

FIG. 10 is a view illustrating an electric field simulation result of the electro-optical device having a single medium layer according to Example 4 of the present invention illustrated in FIG. 9. In this example, the electrodes 106 and 202 are set to have the same potential and the electrodes 105 and 201 are set to have the same potential, and hence it is found that electric fields are applied between the electrodes 105 and 106, between the electrodes 105 and 202, between the electrodes 201 and 202, and between the electrodes 106 and 201. Specifically, as illustrated in FIG. 9, by those electric fields, the optical-anisotropies 108 and 206 are imparted to the media, of the medium layer 203, positioned in the region between the electrodes 105 and 106, the region between the electrodes 105 and 202, the region between the electrodes 106 and 201, and the region between the electrodes 201 and 202.

Example 5

Figure 11:
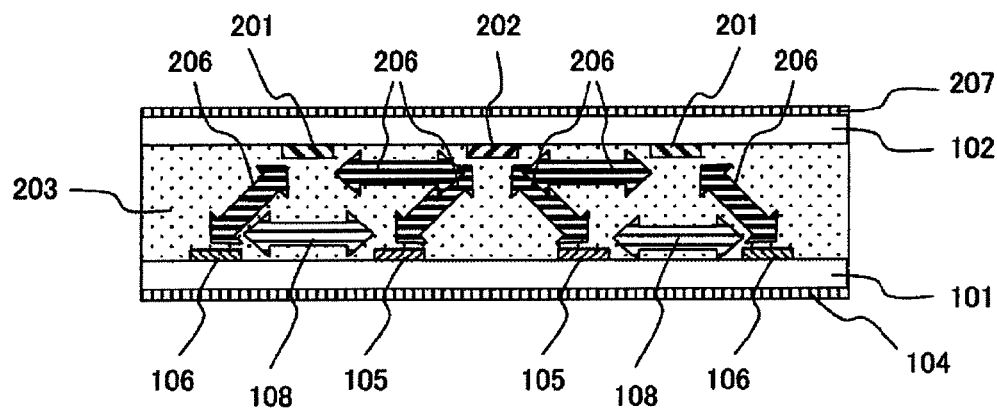
FIG. 11 is a vertical cross-sectional view of an electro-optical device according to Example 5 of the present invention.
Figure 13:
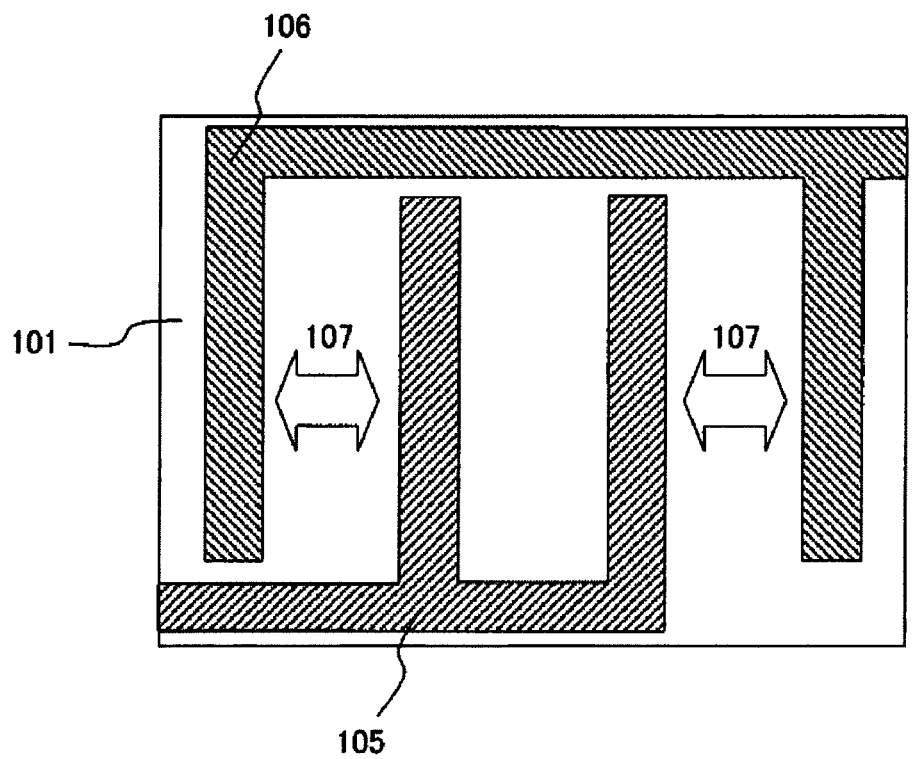
FIG. 13 is a plan view of an electrode according to Example 5 of the present invention.

FIG. 11 is a vertical cross-sectional view of an electro-optical device having a single medium layer according to Example 5 of the present invention. A plane structure of a substrate 102 having electrodes is the same as in FIG. 3. A plane structure of a substrate 101 having electrodes is illustrated in FIG. 13. Similarly to the electro-optical device of Example 1 of FIG. 1, when different potentials are applied between the electrodes 105 and 106, the optical-anisotropy 108 is imparted to a medium of the medium layer 203 positioned in a region between the electrodes 105 and 106. Further, when different potentials are applied between the electrodes 201 and 202, the optical-anisotropy 206 is imparted to a medium of the medium layer 203 positioned in a region between the electrodes 201 and 202. Moreover, when different potentials are applied between the electrodes 105 and 202 and between the electrodes 106 and 201, the optical-anisotropies 206 can also be imparted to media of the medium layer 203 positioned in a region between the electrodes 105 and 202 and a region between the electrodes 106 and 201. Regions of the optical-anisotropies 206 imparted by the electrodes 201 and 202 formed on the second substrate 102 are regions immediately above the electrodes 105 and 106 formed on the first substrate 101 in the direction normal to the substrate, respectively. As a result, as in the electro-optical device of Example 1, when a voltage is applied, light of the incident light, which has passed through the transparent electrodes 105 and 106, is also transmitted outside, thereby to obtain high transmittance.

Figure 12:
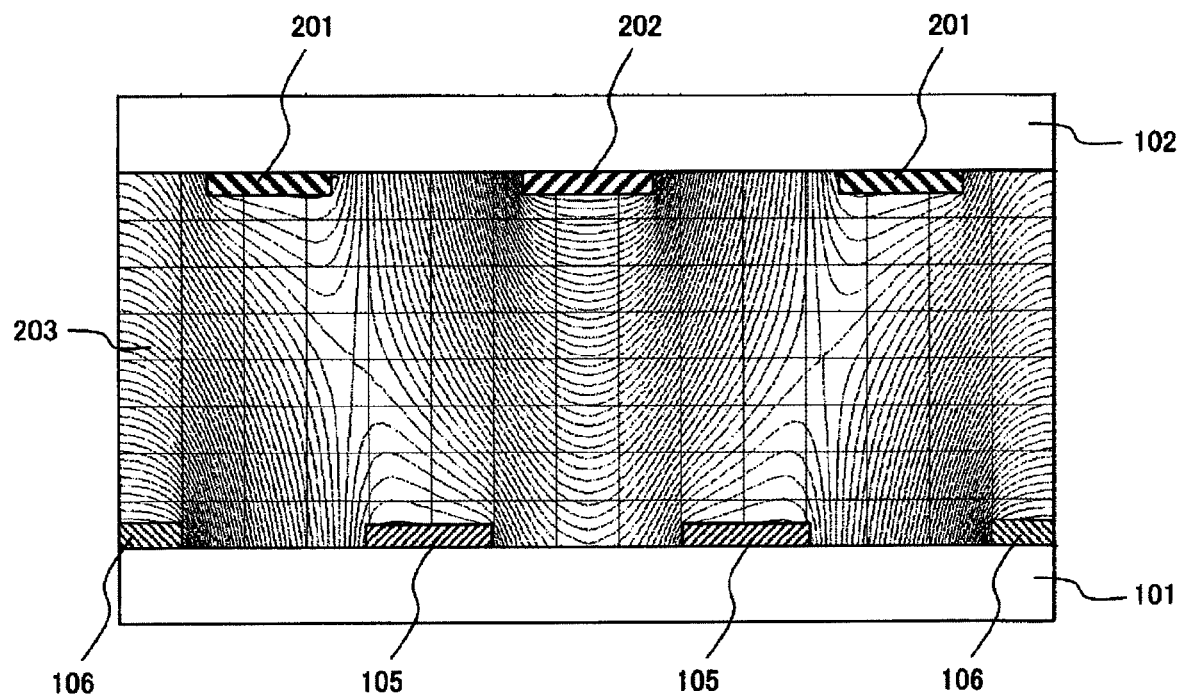
FIG. 12 is a view illustrating an electric field simulation according to Example 5 of the present invention.

FIG. 12 is a view illustrating an electric field simulation result of the electro-optical device having a single medium layer according to Example 5 of the present invention illustrated in FIG. 11. In this example, the electrodes 106 and 202 are set to have the same potential and the electrodes 105 and 201 are set to have the same potential, and hence it is found that electric fields are applied between the electrodes 105 and 106, between the electrodes 105 and 202, between the electrodes 201 and 202, and between the electrodes 106 and 201. Specifically, as illustrated in FIG. 11, by those electric fields, the optical-anisotropies 108 and 206 are imparted to the media, of the medium layer 203, positioned in the region between the electrodes 105 and 106, the region between the electrodes 105 and 202, the region between the electrodes 106 and 201, and the region between the electrodes 201 and 202.

Example 6

Figure 14:
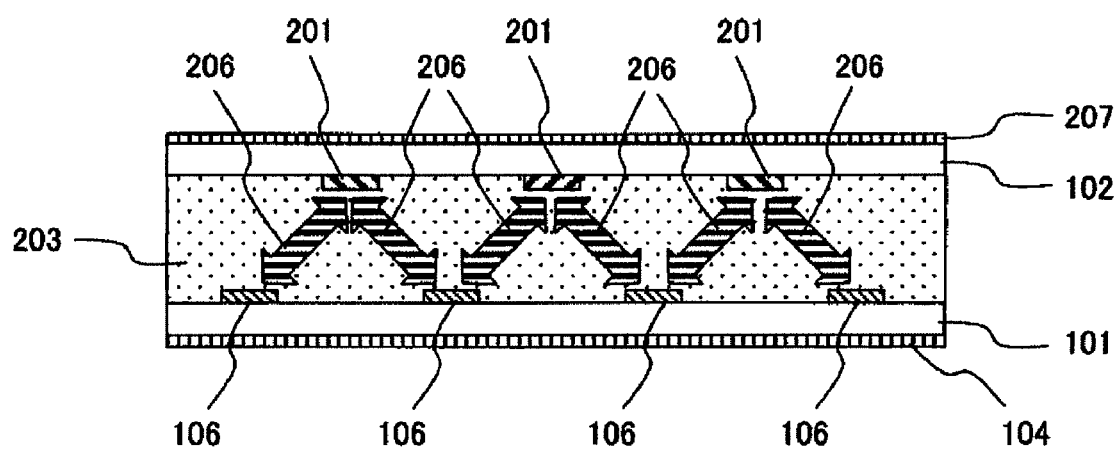
FIG. 14 is a vertical cross-sectional view of an electro-optical device according to Example 6 of the present invention.
Figure 16:
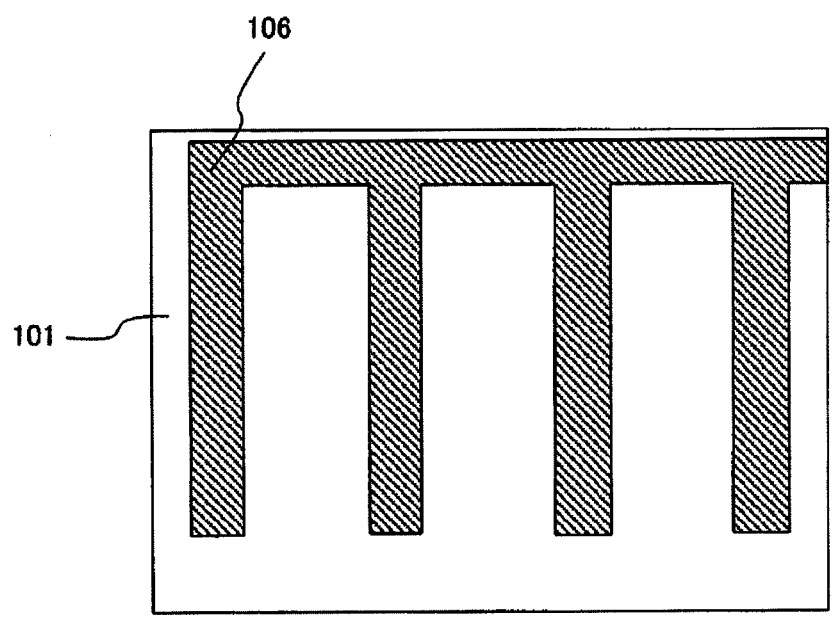
FIG. 16 is a plan view illustrating a substrate having an electrode of the electro-optical device according to Example 6 of the present invention.
Figure 17:
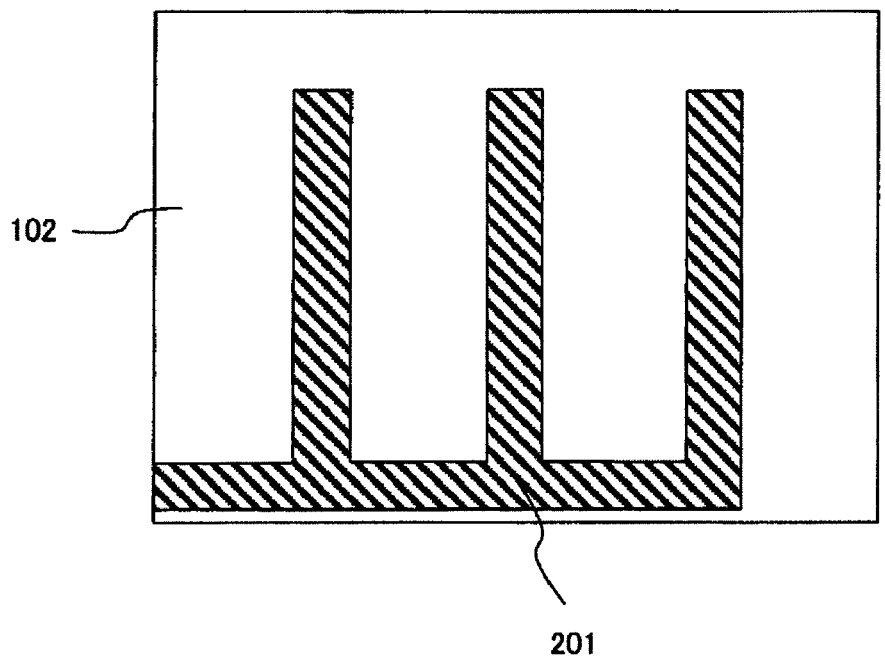
FIG. 17 is a plan view illustrating another substrate having an electrode of the electro-optical device according to Example 6 of the present invention.
Figure 18:
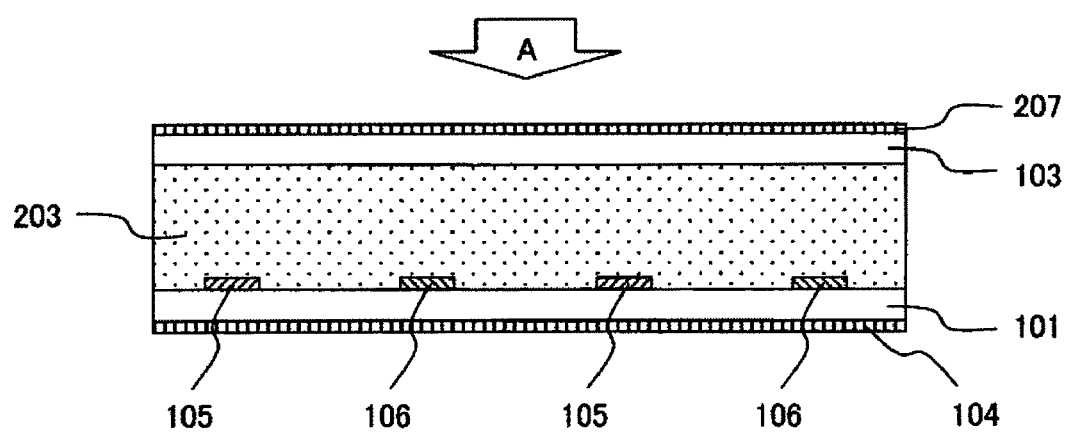
FIG. 18 is a vertical cross-sectional view of an electro-optical device according to a related art.
Figure 19:
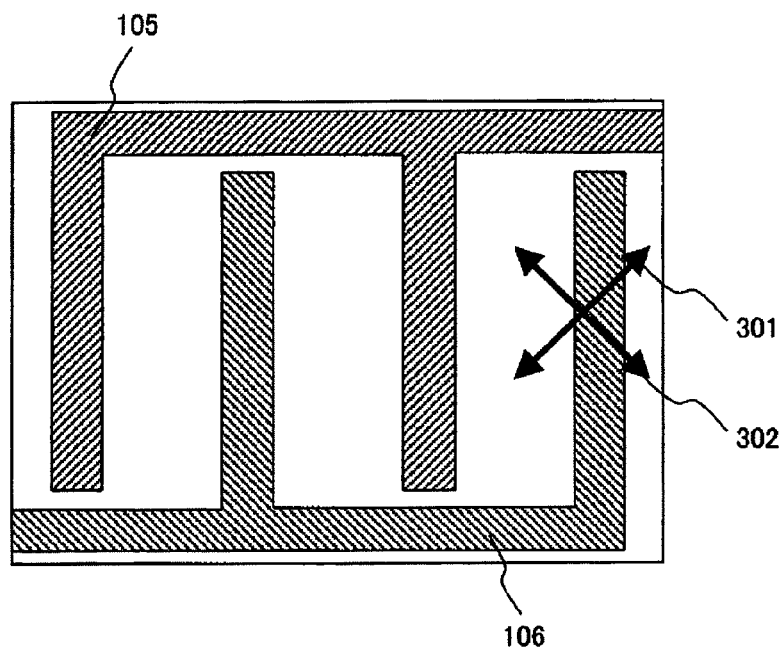
FIG. 19 is a plan view illustrating a substrate having an electrode of the electro-optical device according to the related art.

FIG. 14 is a vertical cross-sectional view of an electro-optical device having a single medium layer according to Example 6 of the present invention. A plane structure of a substrate 101 having an electrode is illustrated in FIG. 16, and a plane structure of a substrate 102 having an electrode is illustrated in FIG. 17. When different potentials are applied between the electrodes 106 and 201, the optical-anisotropy 206 is imparted to a medium of the medium layer 203 positioned in a region between the electrodes 106 and 201. The optical-anisotropy 206 is imparted in an oblique direction, and therefore regions having the optical-anisotropy are positioned immediately above the electrode 106 of the first substrate 101 and the electrode 201 of the second substrate 102 in the direction normal to the substrates. As a result, when a voltage is applied, light of the incident light, which has passed through the transparent electrodes 106 and 201, is also transmitted outside, to thereby obtain high transmittance.

Figure 15:
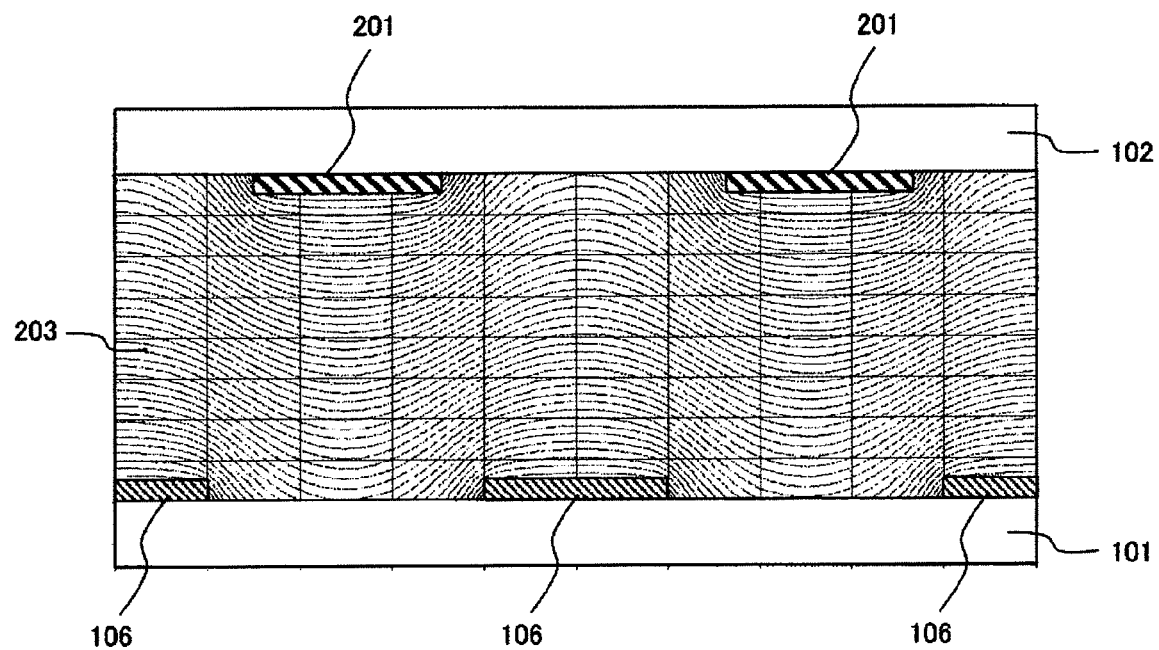
FIG. 15 is a view illustrating an electric field simulation according to Example 6 of the present invention.

FIG. 15 is a view illustrating an electric field simulation result of the electro-optical device having a single medium layer according to Example 6 of the present invention illustrated in FIG. 14. In this example, different potential are applied between the electrodes 106 and 201, and hence it is found that an electric field is applied between the electrodes 106 and 201. It is found that the electric field between the electrodes 106 and 201 is also generated above the respective electrodes. Specifically, as illustrated in FIG. 14, by the electric field, the optical-anisotropy 206 is imparted to the medium, of the medium layer 203, positioned in the region between the electrodes 106 and 201.

In the electro-optical device of the present invention, the basic structures each serving as one pixel illustrated in FIGS. 1, 5, 7, 8, 9, 11, or 14 are arranged in matrix, respective electrodes are connected to each other, and a backlight is provided, whereby the electro-optical device can be used as a display device.

In this case, the display device is provided with a plurality of data signal lines and a plurality of scanning signal lines, which intersect with each other, and a plurality of common signal lines. Further, when the display device is provided with an active device which is switched on/off by a signal supplied by the scanning signal lines, one side of the interdigit electrodes of a first electrode group and one side of the interdigit electrodes of a second electrode group thereof are set as source electrodes which are connected to the data signal lines via the active device, and the other sides are set as common electrodes which are connected to the common signal lines, whereby the display device can be an active matrix type display device. The active devices may be provided to the first electrode group and to the second electrode group separately, or the active device may be provided to one of the first electrode group and the second electrode group to electrically connect the source electrodes of the first electrode group and the source electrodes of the second electrode group. To the interdigit electrodes corresponding to the common electrodes of the first electrode group and the second electrode group, different potentials may be applied, or the first electrode group and the second electrode group may be electrically connected to each other. Further, a color filter may be provided on one of the substrates to obtain a color display device.

Moreover, in this liquid crystal display device, in order to improve dependency of display characteristics on viewing angle, a plurality of directions in which optical-anisotropy is generated may be provided in one pixel. In this case, the interdigit electrodes may be arranged so that directions of optical-anisotropy are orthogonal to each other in a plane. In this liquid crystal display device, high transmittance can be obtained as the effect of the present invention. Accordingly, there can be obtained a display device in which light from a backlight can be efficiently emitted, power consumption is reduced, and white luminance is high.

Note that the electro-optical device of the present invention is not limited to the structures illustrated in the drawings, and can be modified and combined without departing from the gist of the present invention. For example, a plurality of regions having different directions of optical-anisotropy may be formed in one device.

Second Embodiment

Next, a second embodiment of the present invention is described.

The display device of the present invention is to generate electric fields between source electrodes and common electrodes which are arranged on substrates sandwiching isotropic liquid crystals and, by changing the electric field intensities, to control optical characteristics of an isotropic liquid crystal layer. Here, the isotropic liquid crystals are optically isotropic when a voltage is not applied, and induce birefringence in a direction of a applied voltage. Devices using such isotropic liquid crystals described above are disclosed in JP 05-336477 A and JP 2006-3840 A. Considering the property of the isotropic liquid crystal as described above, in order to control transmittance of the isotropic liquid crystal, it is necessary to arrange upper and lower polarizing plates in crossed-nicols and apply an electric field of an in-plane direction (horizontal direction) of a liquid crystal panel. Accordingly, in a liquid crystal panel using the isotropic liquid crystal, an electrode structure of an in-plane-switching (IPS) type is basically suitable. However, in this structure, the electric field of the in-plane direction of the panel is not generated above the electrodes, and hence electrode portions do not contribute to transmission. In order to perform excellent display by using the isotropic liquid crystal, it is necessary to improve the electrode structure of a normal IPS type and provide a device structure in which an electric field parallel to a panel surface is generated more.

Figure 21:
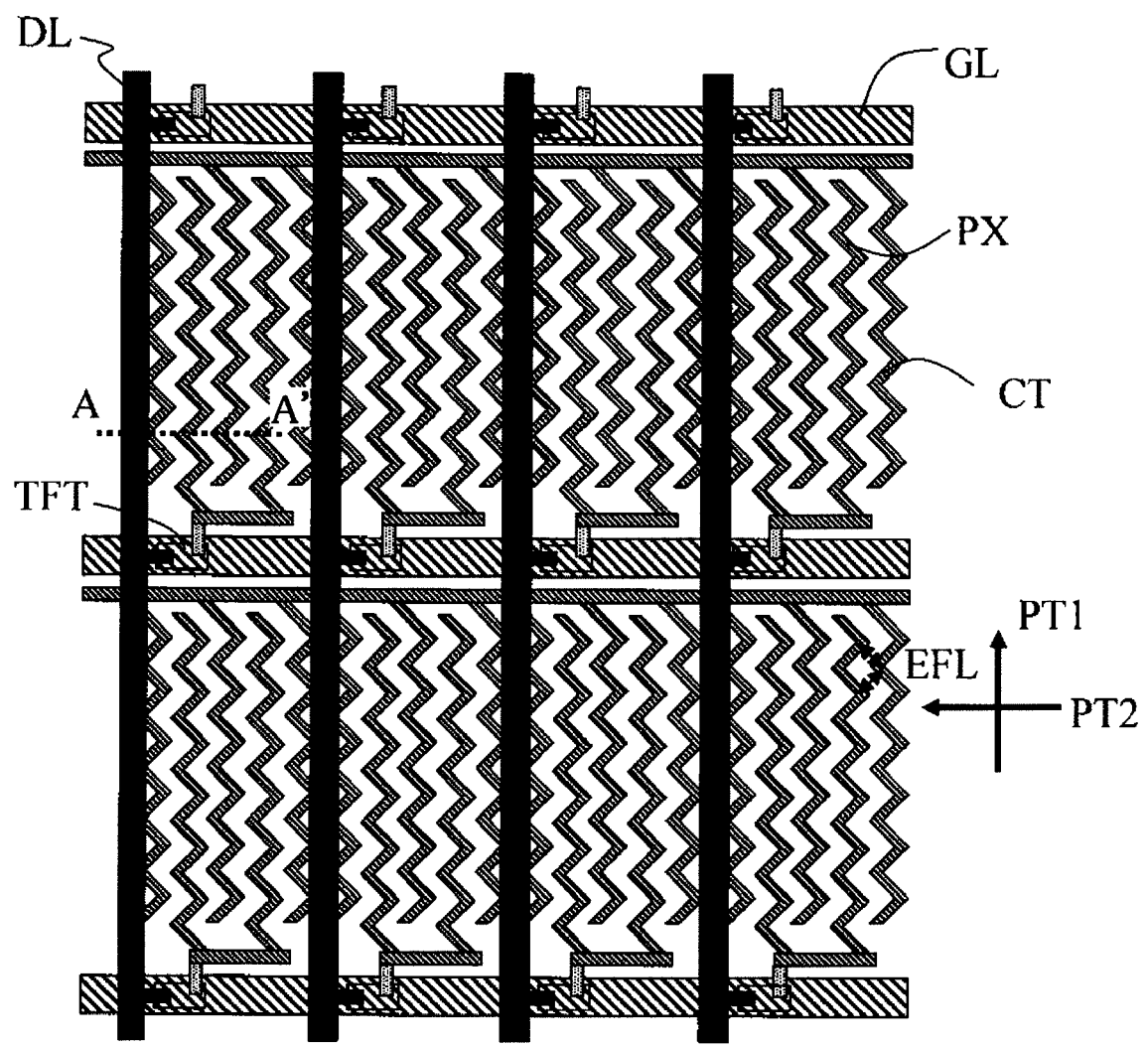
FIG. 21 is a view illustrating a plane structure of pixels of a display device according to the present invention.
Figure 22:
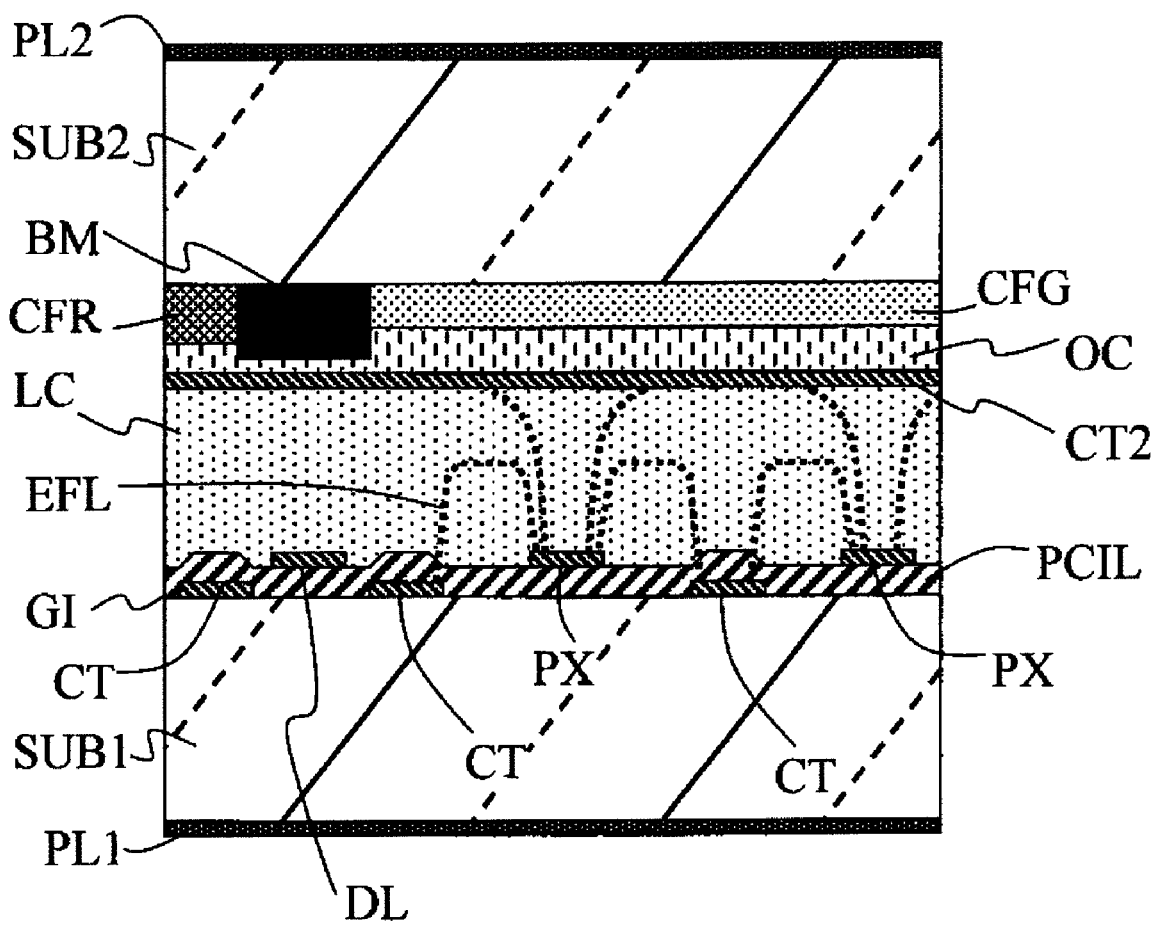
FIG. 22 is a cross-sectional view illustrating a pixel structure of the display device according to the present invention.

Based on the viewpoint as described above, a device structure which is suitable for isotropic liquid crystals is illustrated in FIGS. 21 and 22.

FIG. 21 illustrates an example of a pixel group structure provided to the display device of the present invention. A data signal of a data signal line DL is supplied to a source electrode PX via a thin film transistor (TFT) which is controlled by a gate signal line GL. Electric fields are formed among the source electrode PX, a common electrode CT, and an electrode CT2 described below, and the isotropic liquid crystals are driven, to thereby perform display.

FIG. 22 is a cross-sectional view taken along a line A-A of FIG. 21. On an upper substrate SUB2 having a color filter CF, a black matrix BM is arranged to prevent unnecessary light leakage. The color filter CF has different colors in pixels adjacent to each other in a horizontal direction, and hence each pixel has different color. On the color filter CF and the black matrix BM, an over coat film OC for planarization is applied, and thereon, the electrode CT2 is formed.

On the other hand, a lower substrate SUB1 has the common electrode CT and the source electrode PX formed into an interdigit shape in each pixel. An insulating film GI is formed between the common electrode CT and the source electrode PX, and the data signal line DL is provided to the source electrode PX so as to a potential difference from the common electrode CT for each pixel. A protective film PAS is formed on the data signal line DL, and the source electrode PX is arranged thereon. The common electrode CT and the source electrode PX are formed of, for example, a transparent electrode such as ITO. Further, the substrate SUB1 and the substrate SUB2, which form a pair, have a polarizing plate PL1 and a polarizing plate PL2, respectively, and transmission axes of the polarizing plate PL1 and the polarizing plate PL2 a rearranged in crossed-nicols.

The electrode CT2 is driven so as to have the same potential as that any one of the common electrode CT and the source electrode PX. Hereinafter, description is made on the assumption that the electrode CT2 and the common electrode CT have the same potential unless otherwise stated. However, as long as there is no limitation on a circuit configuration or a process, the electrode CT2 may be driven having the same potential as that of the source electrode PX.

With this structure, when a voltage is not applied, the isotropic liquid crystals are isotropic, whereby black is displayed. When a voltage is applied, birefringence in a direction of a applied voltage is induced in parallel to a panel surface between the common electrode CT and the source electrode PX and above the common electrode CT2, whereby white is displayed. Above any one of the common electrode CT and the source electrode PX having the same potential as that of the electrode CT2, an electric field parallel to the panel surface is formed and birefringence is generated, whereby a region above any one of those electrodes also contributes to transmission at a time of white display. As described above, regions not only between the electrodes but also above the electrodes contribute to the transmission, and accordingly the transmittance of the display device can be improved.

Note that the present invention has the feature in which, in the structure of the electrodes formed on the glass substrate, at least one of the source electrode PX and the common electrode CT is formed into an interdigit shape, and in this case, another one of the electrodes may be formed into a plate shape.

Hereinafter, examples of this embodiment are specifically described.

Example 7

FIG. 21 is a view illustrating a plane structure of pixel portions of a display device according to Example 7 of the present invention. FIG. 22 is a view illustrating a cross-sectional structure of the pixel portions. A manufacturing method for the display device is not related to the essence of the present invention, and therefore detailed description thereof is omitted but a rough outline thereof is described below.

A thin film transistor (TFT) and wiring electrodes SL and GL were formed on one of the substrates, the substrate SUB1.

In a display region of a pixel, the electrode CT was formed into an interdigit shape on the substrate SUB1 as a transparent conductive layer formed of ITO, and an insulating layer PCIL formed of a silicon nitride or an organic compound was formed thereon. In this example, a thickness of the interdigit electrode CT formed of ITO and a thickness of the insulating layer PCIL were set to 77 nm and 500 nm, respectively.

Next, as illustrated in FIG. 22, the electrode PX having an interdigit shape was formed with a thickness of 77 nm as an ITO electrode layer on the insulating layer PCIL. Here, a distance between the electrode PX and the electrode CT is set to 10.0 μm.

On another of the substrate SUB2, the black matrix BM and a color filter CFG were formed, and then the over coat film OC was applied thereon. After the substrate was subjected to baking, the electrode CT2 was formed at a thickness of 77 nm as an ITO electrode film.

Those two substrates were bonded with a spacer and a sealing adhesive in a peripheral portion to construct a cell.

Further, the cell was filled with a medium exhibiting optical-isotropy described below in vacuum and sealed with a sealing agent made of a UV curable resin, to thereby manufacture a panel.

In this case, a thickness (gap) of a layer LC made of the medium exhibiting optical-isotropy was adjusted with the above-mentioned spacer so that a relationship of a gap "d" and a distance "l" between the source electrode PX and the common electrode CT was d≧l and the gap "d" was 13.0 μm in a sealed state.

Next, the panel was sandwiched by the two polarizing plates PL1 and PL2 (SEG 1224 DU, manufactured by Nitto Denko Corporation), and the two polarizing plates PL1 and PL2 were arranged so that a polarized-light transmission axis of one of the polarizing plates was orthogonal to that of the other polarizing plate. Directions of transmission axes PT1 and PT2 of the polarizing plates PL1 and PL2 were set to have an angle of 45 degrees with respect to an angle of an in-plane direction of an electric flux line EFL.

The interdigit electrodes CT and PX and the electrode CT2 were connected to a driver circuit so that an alternating drive voltage ACV was applied thereto, and were modularized with a backlight connected thereto, to thereby obtain a display device.

As the medium exhibiting optical-isotropy, which is sandwiched between the substrates, there was used the liquid crystal material which exhibits an optically-isotropic blue phase, such as a liquid crystal composition made of a liquid crystal material JC-1041XX manufactured by Chisso Corporation, described in Hirotsugu Kikuchi, Advanced Materials, Vol. 17, pp. 96-98, 2005, a liquid crystal material 4-cyano-4'-pentylbiphenyl (5CB) manufactured by Sigma-Aldrich Corporation, and a chiral dopant ZLI-4572 manufactured by Merck & Co., Inc. However, in addition to this material, another medium may be used in the same manner as long as exhibiting optically isotropic properties when a voltage is not applied and optically anisotropic properties when a voltage is applied. For example, a medium obtained by orienting bent-core molecules, which are described in Hideo Takezoe et al., Jpn. J. Appl. Phys. Vol. 45, pp. L282-L284, 2006, with a vertical orientation film may be used. In this case, it is necessary to form an orientation film between a liquid crystal layer and a substrate, but in the present invention, types of the orientation film or methods for an orientation process are not limited.

As a result of driving the obtained display device, a display device having high transmittance was obtained. As a result of observing pixels of the driving display device, it was found that light was transmitted between the source electrode PX and the common electrode CT and through a part above the common electrode CT, and the high transmittance was obtained by an effect in which the part above the electrode CT also contributed to display.

Figure 23:
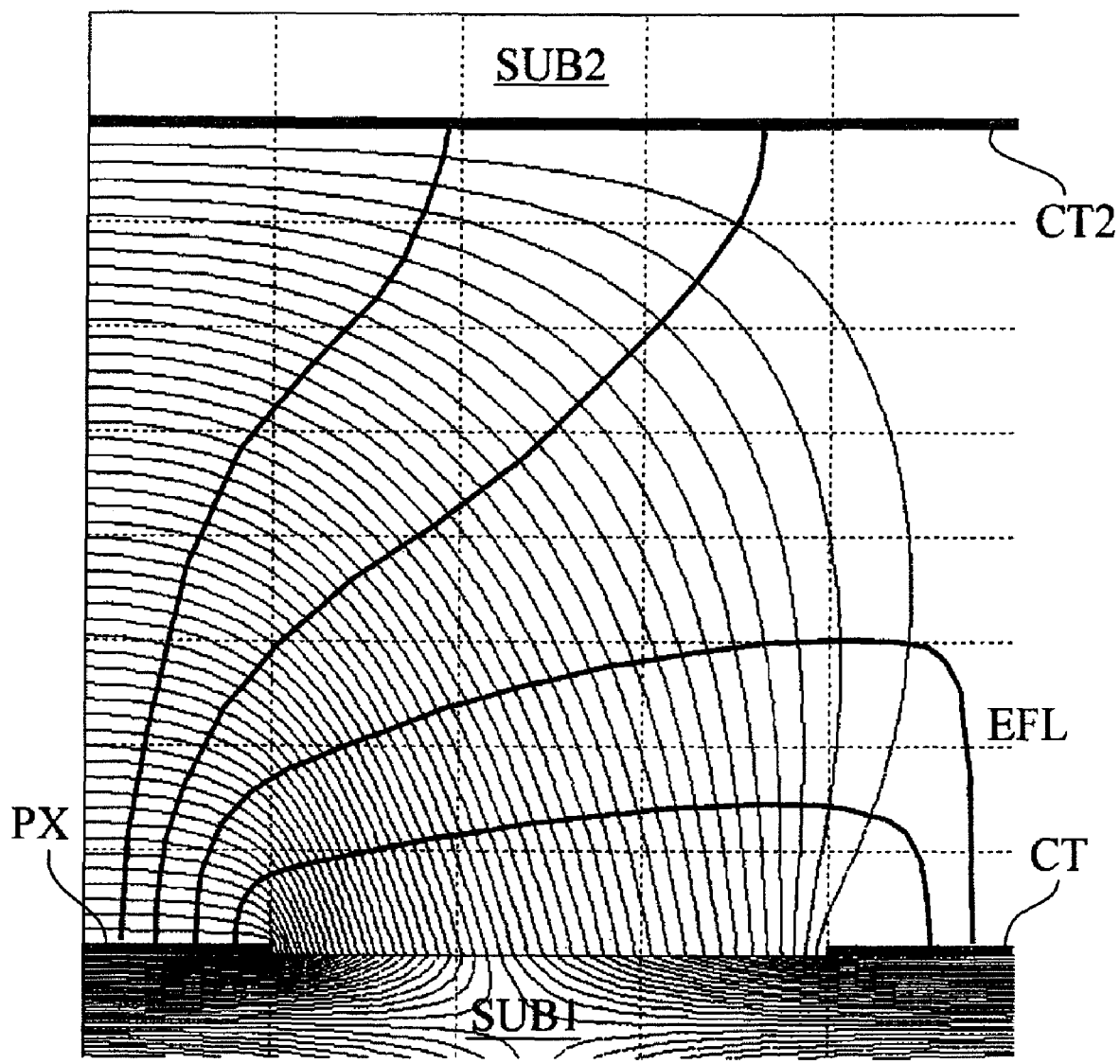
FIG. 23 is a view illustrating results of an electric field simulation in the pixels of the display device according to the present invention.

FIG. 23 is an electric field simulation in which a pixel structure according to this example is simulated. In FIG. 23, the electric flux line EFL is formed so as to vertically intersect with equipotential lines which are generated among the source electrode PX and the common electrodes CT and CT2. According to the electric field simulation, it is found that the electric flux line which is substantially parallel to the substrate SUB1 is generated between the source electrode PX and the common electrode CT. The medium having optical-isotropy used in the present invention generates birefringence in a direction in which the electric flux line is generated, and hence light is transmitted through only a portion in which birefringence is generated along the electric flux line. Accordingly, transmitted light intensity between the source electrode PX and the common electrode CT changes depending on a magnitude of the generated birefringence, and thus the medium can be used as a display device. Further, above the source electrode PX, an electric flux line which is substantially parallel to a surface of the substrate SUB1 is almost not generated, whereas an electric flux line parallel thereto is generated above the common electrode CT. For this reason, with use of the transparent electrode made of ITO for the common electrode CT as in the structure of the present invention, transmittance can be improved.

Comparative Example 1

In the display device according to Example 7, setting a relationship of a cell gap "d" and a distance "l" between the source electrode PX and the common electrode CT to d<l, a display device was formed so that "l" was 10.0 μm and "d" was 4 μm.

As a result of driving the display device, the transmittance was reduced compared with the display device of Example 7.

Comparative Example 2

Figure 24:
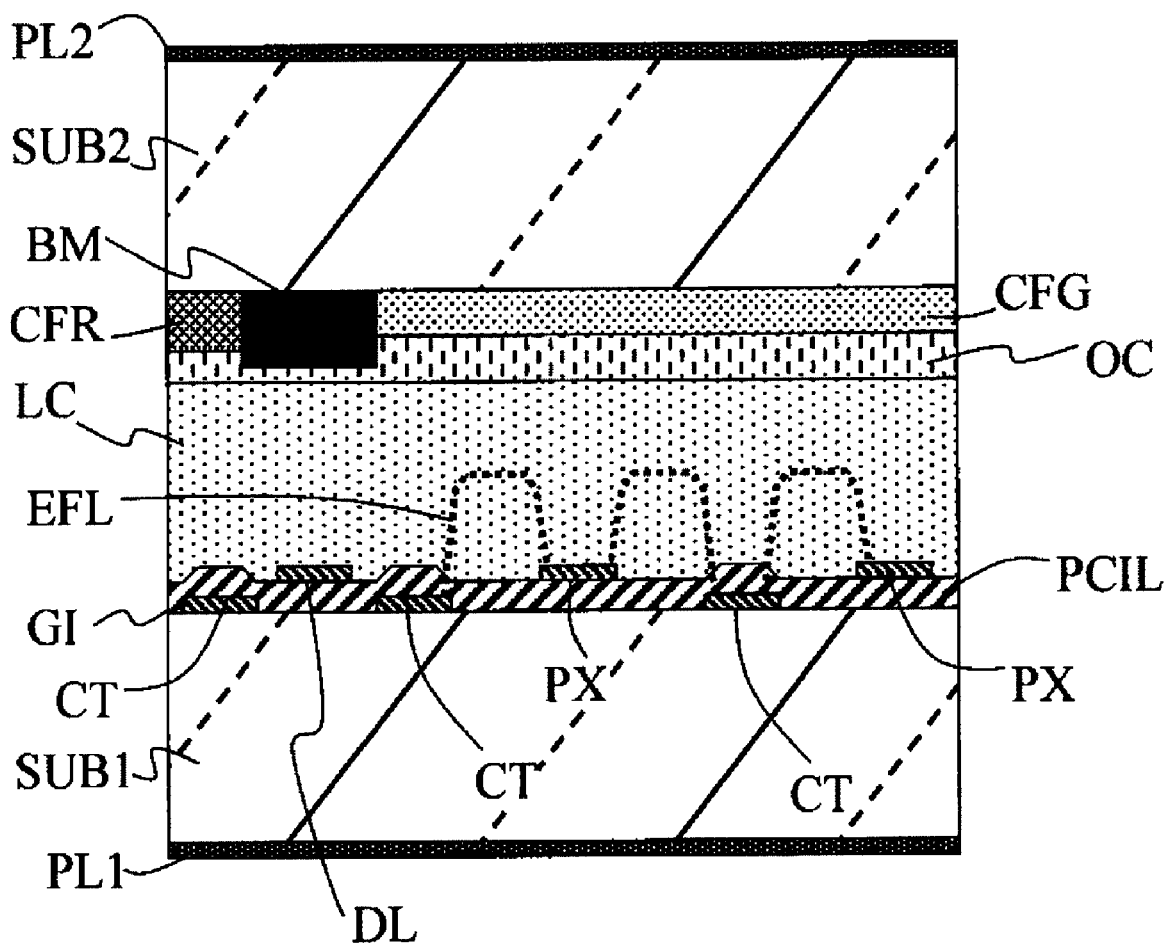
FIG. 24 is a cross-sectional view illustrating a pixel structure of a display device according to Comparative Example 2.

FIG. 24 is a view schematically illustrating a cross section of a display device used in Comparative Example 2. The display device has a similar device structure as that of Example 7 except that the electrode CT2 formed on the substrate SUB2 in Example 7 is not provided, and a manufacturing method therefor is as described in Example 7.

Figure 25:
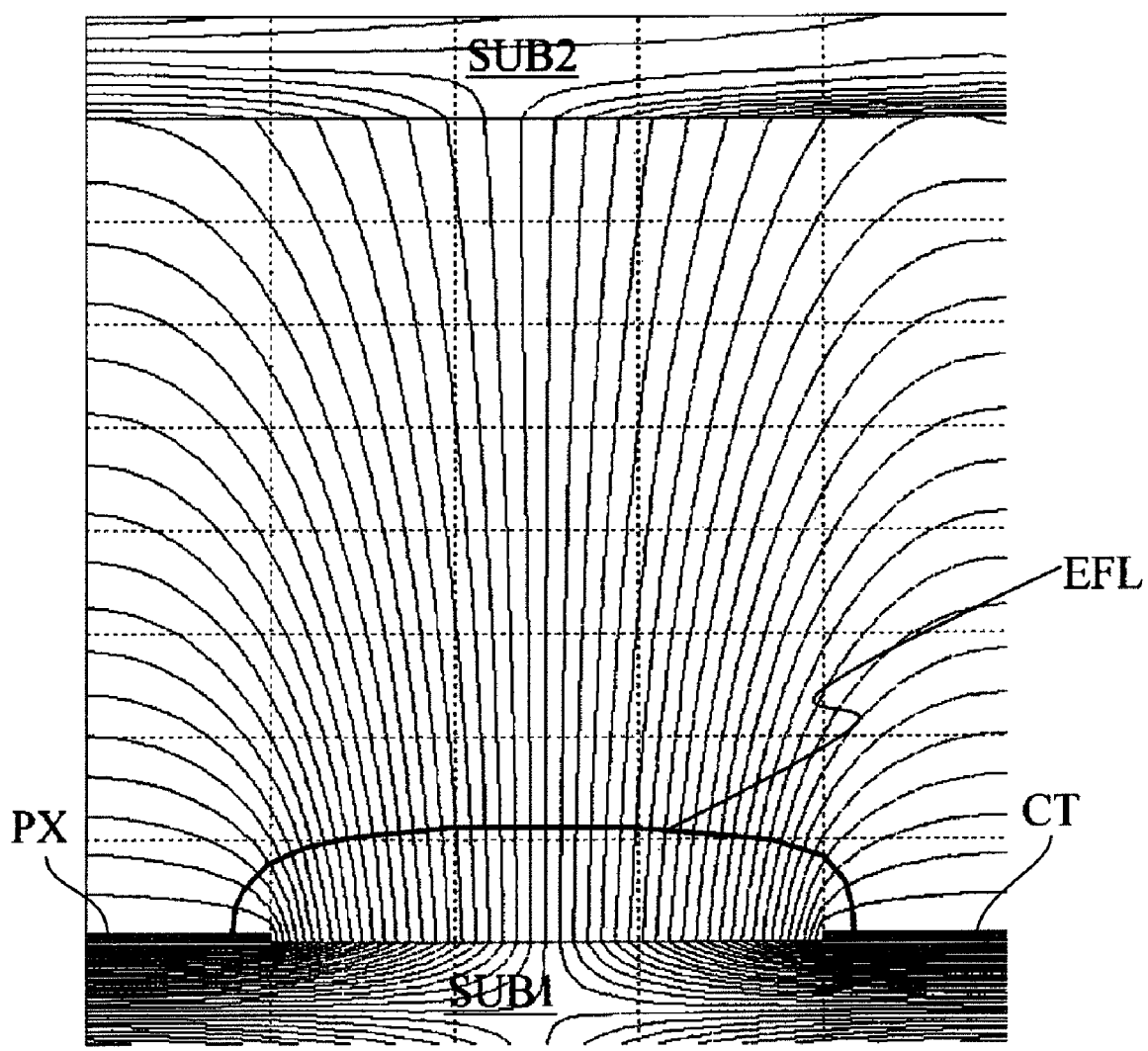
FIG. 25 is a view illustrating results of an electric field simulation in pixels of the display device according to Comparative Example 2.

As a result of driving the display device, the transmittance was reduced compared with the display device of Example 7. FIG. 25 illustrates results of an electric field simulation in which a pixel structure of the display device according to Comparative Example 1 is simulated. In FIG. 25, it is apparent that an electric flux line which is substantially parallel to the substrate SUB1 is generated between the source electrode PX and the common electrode CT, and is almost not generated above the source electrode PX and the common electrode CT.

Example 8

Figure 26:
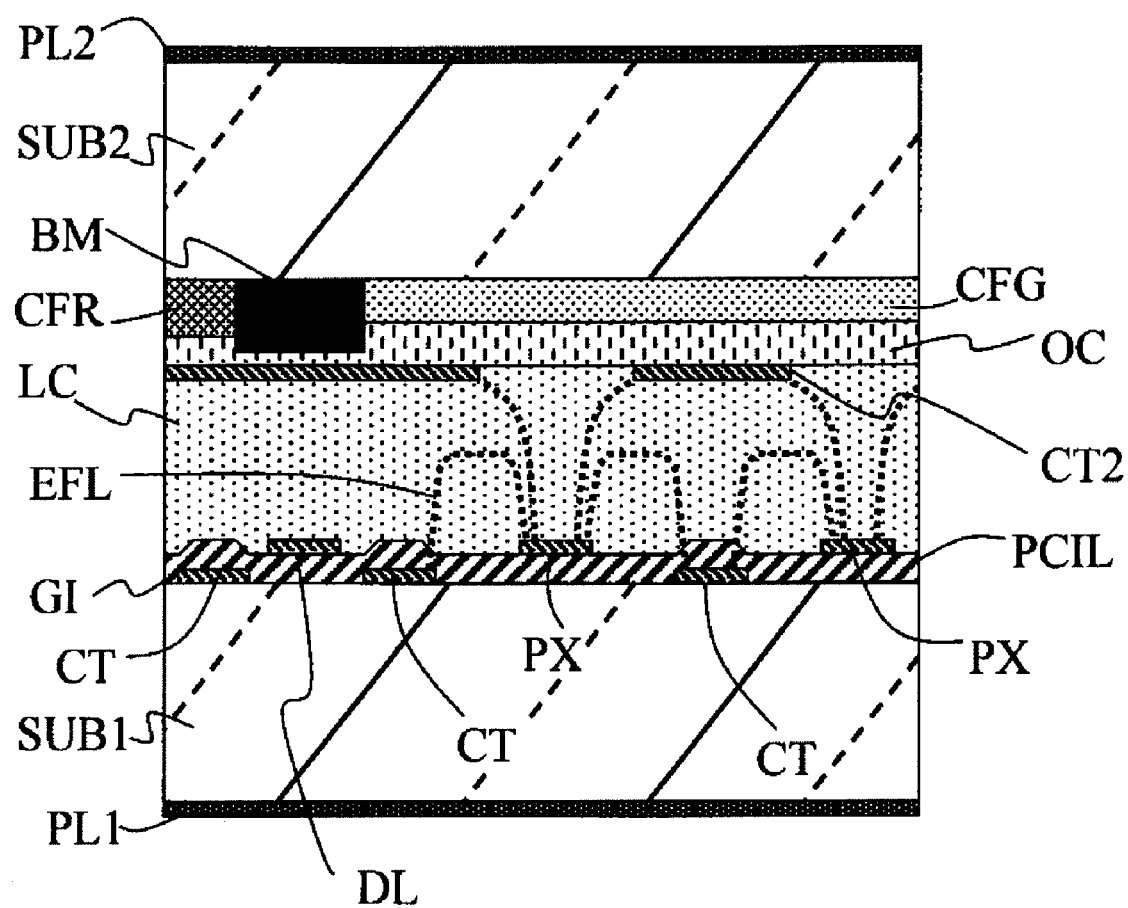
FIG. 26 is a cross-sectional view illustrating a pixel structure of a display device according to Example 8 of the present invention.

FIG. 26 is a view schematically illustrating a cross section of a display device to which the second embodiment of the present invention is applied. In the display device according to Example 7, the electrode CT2 was formed uniformly on the substrate SUB2. On the other hand, in this example, the electrode CT2 made of ITO was removed at a portion positioned immediately above the source electrode PX by dry etching, to thereby form a slit. In this case, a width of the slit was set to the same width as that of the source electrode PX. Further, as illustrated in FIG. 21, the source electrode PX has a bending structure, and hence the slit was also formed so as to be bent. Further, the display device was manufactured in similar manufacturing conditions and pixel structure as in other examples, except that the slit was formed in the electrode CT2.

As a result of driving the obtained display device, excellent display was obtained. Further, as a result of observing pixels of the driving display device, it was found that light was transmitted between the source electrode PX and the common electrode CT and through a part above the common electrode CT, and the high transmittance was obtained by an effect in which the part above the electrode CT also contributed to display.

While there have been described what are at present considered to be certain embodiments of the invention, it is understood that various modifications may be made thereto, and it is intended that the appended claims cover all such modifications as fall within the true spirit and scope of the invention.

What is claimed is:

1. An electro-optical device, comprising:
   a plurality of substrates which are opposed to and parallel to each other;
   a medium layer sandwiched between the plurality of substrates;
   a pair of polarizing plates which are arranged so that absorption axes thereof are substantially orthogonal to each other with the medium layer sandwiched between the pair of polarizing plates; and
   a plurality of electrode groups including a plurality of transparent electrodes having an interdigit shape which are formed on at least two of the plurality of substrates in at least one pixel of the electro-optic device and arranged substantially parallel to each other, the plurality of electrode groups formed on one of the at least two of the plurality of substrates being separate from one another, and the plurality of electrode groups formed on another of the at least two of the plurality of substrates being separate from one another;
   the electro-optical device controlling light transmission and interception by an electric field applied to the plurality of electrode groups, wherein:
   the medium layer includes a medium substantially having optical-isotropy with absence of an electric field and exhibiting optical-anisotropy along with an applied electric field; and
   the optical-anisotropy is imparted to the medium layer by applying an electric field to a region of the medium layer including regions above the plurality of transparent electrodes in a direction normal to the plurality of substrates by at least two of the plurality of electrode groups;
   wherein any of the interdigit portions of any of the plurality of electrode groups formed in the at least one pixel on the one of the at least two of the plurality of substrates is arranged so as to avoid overlap with any of the interdigit portions of any of the plurality of electrode groups formed in the at least one pixel on the another of the at least two of the plurality of substrates in the direction normal to the plurality of substrates.

2. An electro-optical device according to claim 1, wherein the plurality of electrode groups impart an electric field at least in a direction parallel to the plurality of substrates to the medium layer.

3. An electro-optical device according to claim 2, wherein a region of the medium layer to which the electric field is applied by one of the plurality of electrode groups includes a region above another one of the plurality of electrode groups in the direction normal to the plurality of substrates.

4. An electro-optical device according to claim 1, wherein:
the absorption axes of the pair of polarizing plates are arranged at an angle of 45 degrees±10 degrees with respect to a direction of the applied electric field to the medium layer in the direction normal to the plurality of substrates; and
a direction of the optical-anisotropy which is imparted to the regions above the plurality of transparent electrodes in the direction normal to the plurality of substrates by optical-anisotropy imparting means is one of substantially parallel to and substantially orthogonal to the direction of the applied electric field to the medium layer.

5. An electro-optical device according to claim 1, wherein electric field components of electric fields applied to the medium layer by the plurality of electrode groups in the direction normal to the plurality of substrates are substantially parallel to each other, and the electric fields are applied to the medium layer substantially at the same time.

6. An electro-optical device according to claim 1, further comprising:
a first substrate and a second substrate which are opposed to each other;
a first medium layer sandwiched between the first substrate and the second substrate;
a third substrate opposed to the second substrate;
a second medium layer sandwiched between the second substrate and the third substrate;
a first plurality of electrode groups provided to the first substrate on a surface side opposed to the second substrate, for applying the electric field to the first medium layer; and
a second plurality of electrode groups provided to the second substrate on a surface side opposed to the third substrate, for applying the electric field to the second medium layer.

7. An electro-optical device according to claim 1, further comprising:
a first substrate and a second substrate which are opposed to each other;
a first medium layer sandwiched between the first substrate and the second substrate;
a third substrate opposed to the second substrate;
a second medium layer sandwiched between the second substrate and the third substrate;
a first plurality of electrode groups provided to the first substrate on a surface side opposed to the second substrate, for applying the electric field to the first medium layer; and
a second plurality of electrode groups provided to the third substrate on a surface side opposed to the second substrate, for applying the electric field to the second medium layer.

8. An electro-optical device according to claim 1, further comprising:
a first substrate and a second substrate which are opposed to each other;
a first medium layer sandwiched between the first substrate and the second substrate;
a third substrate opposed to the second substrate;
a second medium layer sandwiched between the second substrate and the third substrate;
a first plurality of electrode groups provided to the second substrate on a surface side opposed to the first substrate, for applying the electric field to the first medium layer; and
a second plurality of electrode groups provided to the second substrate on a surface side opposed to the third substrate, for applying the electric field to the second medium layer.

9. An electro-optical device according to claim 1, further comprising:
a first substrate and a second substrate which are opposed to each other;
a medium layer sandwiched between the first substrate and the second substrate;
a first plurality of electrode groups provided to the first substrate on a surface side opposed to the second substrate, for applying the electric field to the medium layer; and
a second plurality of electrode groups provided to the second substrate on a surface side opposed to the first substrate, for applying the electric field to the medium layer.

10. An electro-optical device according to claim 9, wherein one of the first plurality of electrode groups and the second plurality of electrode groups which is provided to at least one of the first substrate and the second substrate comprises a common electrode and a source electrode which are arranged symmetrically.

11. An electro-optical device according to claim 1, further comprising:
a first substrate and a second substrate which are opposed to each other;
a medium layer sandwiched between the first substrate and the second substrate;
an electrode group including a common electrode, which is provided to the first substrate on a surface side opposed to the second substrate; and
an electrode group including a source electrode, which is provided to the second substrate on a surface side opposed to the first substrate,
wherein both the electrode groups impart an inclined electric field to the medium layer.

12. An electro-optical device according to claim 11, wherein:
the absorption axes of the pair of polarizing plates are arranged at an angle of 45 degrees±10 degrees with respect to a direction of the electric field application to the medium layer in the direction of the normal to the plurality of substrates; and
a direction of the optical-anisotropy which is imparted to the regions above the plurality of transparent electrodes in the direction of the normal to the plurality of substrates by optical-anisotropy imparting means is one of substantially parallel to and substantially orthogonal to the direction of the electric field application to the medium layer.

13. A display device, comprising:
a pair of substrates;
a medium sandwiched between the pair of substrates, which has optical-isotropy at a time of no voltage application and generates optical-anisotropy at a time of a voltage application;

a source electrode and a common electrode, one of which is formed into an interdigit shape, provided to at least one of the pair of substrates on a surface opposed to another one of the pair of substrates; and a planar electrode, wherein the planar electrode is formed on an opposed surface of the another one of the pair of substrates, to which a voltage having the same potential as a potential of one of the source electrode and the common electrode is applied, and a relationship between a liquid crystal layer thickness d and an electrode interval l of the one of the source electrode and the common electrode, which is formed into the interdigit shape, is $d \geq l$.

14. A display device according to claim 13, wherein the planar electrode formed on the another one of the pair of substrates includes a region in which a slit is formed and no electric field is generated partially.

15. A display device according to claim 14, wherein the slit is formed above an electrode having a potential which is different from a potential of the planar electrode.

16. An electro-optical device according to claim 1, wherein the one of the plurality of substrates is a first substrate and the another of the plurality of substrates is a second substrate;

wherein the plurality of electrode groups include a first electrode group and a second electrode group provided to the first substrate on a surface side opposed to the second substrate in the at least one pixel, and a third electrode group and a fourth electrode group provided to the second substrate on a surface side opposed to the first substrate in the at least one pixel, the first and second electrode groups being separate from one another, and the third and fourth electrode groups being separate from one another;

wherein the first, second, third and fourth electrode groups include a plurality of transparent electrodes having interdigit shape, respectively; and wherein any of the interdigit portions of the electrodes of the first and second electrode groups provided to the first substrate in the at least one pixel does not overlap with any of the interdigit portions of the electrodes of the third and fourth electrode groups provided to the second substrate in the at least one pixel in the direction normal to the first and second substrates.

17. An electro-optical device according to claim 16, wherein at least one electrode group among the first, second, third, and fourth electrode groups comprises a common electrode and a source electrode arranged adjacently.

18. An electro-optical device according to claim 1, wherein all of the interdigit portions of the plurality of electrode groups formed on the one of the plurality of substrates is non-overlapping with all of the interdigit portions of the plurality of electrode groups formed on at least another of the plurality of substrates in the direction normal to the plurality of substrates.

19. An electro-optical device according to claim 18, wherein at least a portion of the interdigit portions of the electrodes of the at least one electrode group formed on the one substrate and at least a portion of the interdigit portions of the at least another electrode group formed on the second substrate have a same potential applied thereto.

20. An electro-optical device according to claim 16, wherein at least a portion of the interdigit portions of the electrodes of the first electrode group provided on the first substrate and at least a portion of the interdigit portions of the fourth electrode group provided on the second substrate have a same potential applied thereto.

21. An electro-optical device according to claim 16, wherein the first electrode group and the second electrode group provided on the first substrate have respectively first and second different potentials applied thereto, and the third electrode group and the fourth electrode group provided on the second substrate have respectively third and fourth different potentials applied thereto.

22. An electro-optical device according to claim 21, wherein the first and fourth potentials are the same potential and the second and third potentials are the same potential.

* * * * *